United States Patent [19]

Odawa et al.

[11] Patent Number: 5,578,669

[45] Date of Patent: Nov. 26, 1996

[54] WATER-BASED POLYURETHANE COATING COMPOSITION

[75] Inventors: Taketoshi Odawa, Hirakata; Toshihiro Okai, Katano, both of Japan

[73] Assignee: Nippon Paint Co., Ltd., Japan

[21] Appl. No.: 360,024

[22] Filed: Dec. 20, 1994

[30] Foreign Application Priority Data

Dec. 24, 1993 [JP] Japan .................................. 5-347701
Feb. 17, 1994 [JP] Japan .................................. 6-045050
Oct. 20, 1994 [JP] Japan .................................. 6-282631

[51] Int. Cl.$^6$ .............................. C08K 3/32; C08K 3/34; C08L 75/04
[52] U.S. Cl. .................. 524/414; 524/501; 524/541; 524/591; 524/594; 524/839; 524/840; 524/493; 106/14.17; 106/14.37
[58] Field of Search ..................... 524/501, 493, 524/594, 507, 591, 839, 840, 414; 525/375; 106/14.17, 14.37

[56] References Cited

U.S. PATENT DOCUMENTS

| | | | |
|---|---|---|---|
| 4,017,456 | 4/1977 | Tucker et al. | 524/507 |
| 4,197,219 | 4/1980 | Damico | 524/501 |
| 4,719,038 | 1/1988 | Sobata et al. | 524/440 |
| 4,948,829 | 8/1990 | Mitsuji et al. | 524/591 |
| 4,950,701 | 8/1990 | Okamura et al. | 524/237 |
| 5,055,516 | 10/1991 | Fisch et al. | 524/591 |
| 5,231,130 | 7/1993 | Wallon et al. | 524/501 |
| 5,281,655 | 1/1994 | Mitsuji et al. | 524/507 |
| 5,298,059 | 3/1994 | Takimoto et al. | 106/14.17 |
| 5,401,795 | 3/1995 | Brock et al. | 524/839 |
| 5,443,674 | 8/1995 | Fresonke et al. | 524/507 |

FOREIGN PATENT DOCUMENTS 2736542  2/1978  Germany .

*Primary Examiner*—Tae Yoon
*Attorney, Agent, or Firm*—Pollock, Vande Sande & Priddy

[57] ABSTRACT

The present invention relates to a water-based coating composition suited for surface treatment of the metal sheets or plates to be used in building materials, household electric appliances, automobiles and so forth. The object of the present invention is to provide a water-based coating composition for the steel or metal coated steel surface treatment which gives coating films firmly adhering to metal plates and showing a high degree of hardening as well as excellent corrosion resistance, water resistance and weldability upon baking under low-temperature short-period conditions, has electric conductivity suited for electrodeposition coating and provides lubricating property in processing to thereby prevent powdering during processing as well as a method of forming coating films using said composition.

6 Claims, 3 Drawing Sheets

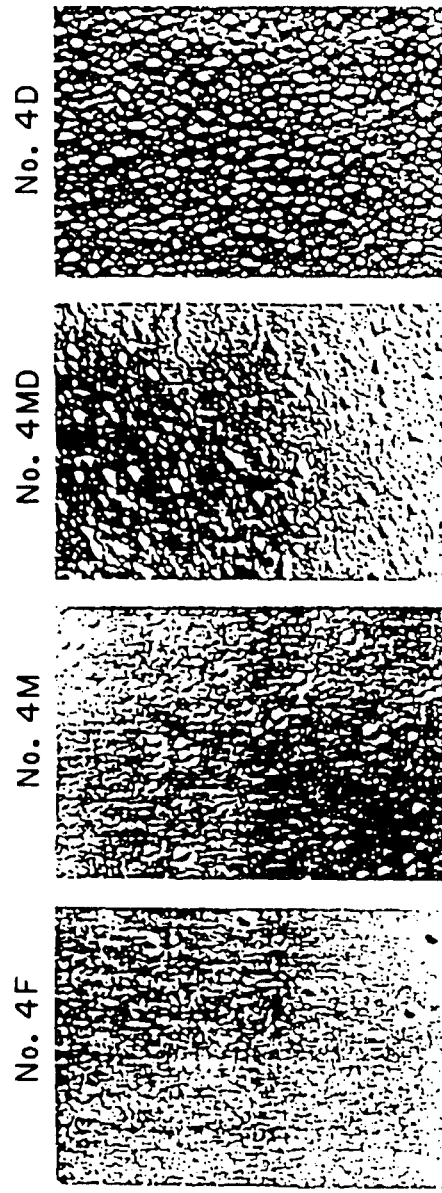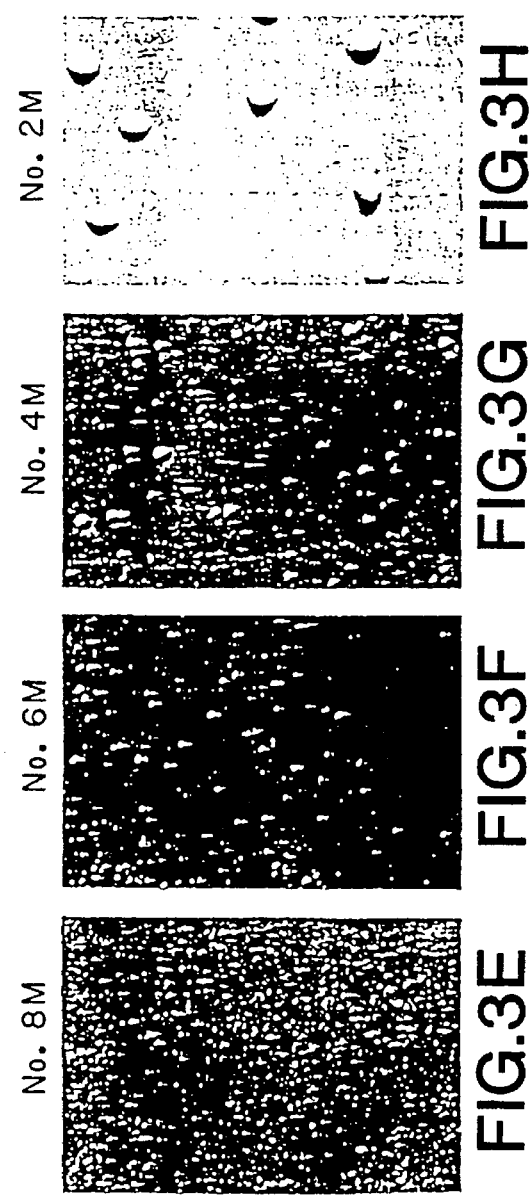

WATER-BASED POLYURETHANE COATING COMPOSITION

FIELD OF THE INVENTION

The present invention relates to a water-based coating composition suited for surface treatment of the metal sheets or plates to be used in building materials, household electric appliances, automobiles and the like. More particularly, it relates to a water-based coating composition for surface treatment of the steel or metal coated steel which composition can form, upon short period baking at low temperatures, coating films firmly adhering to the steel or metal coated steel and excellent in corrosion resistance, water resistance and weld ability, with a high degree of hardening and which composition has electric conductivity suitable for electrodeposition coating and is capable of providing lubricating ability in processing and thus preventing powdering during processing.

PRIOR ART

Metal sheets or plates, for example, cold rolled steel, galvanized steel, electrogalvanized steel, zinc alloy coated steel made by hot dip galvanizing or electrogalvanizing, aluminized steel are widely used in building materials, household electric appliances, automobiles and the like. Metal sheets or plates mentioned above are referred to as "steel or metal coated steel" in this specification. Generally, these steel or metal coated steel are subjected, after forming or shaping processing, to surface treatment for preparation for coating and, before assembling, to coating.

In the above-mentioned step of forming or shaping, a lubricant such as press oil is applied to the steel or metal coated steel surface to improve the processability. However, when such a lubricant is used, a step of removing the lubricant, i.e. degreasing, is inevitably required after press processing but before surface treatment or coating. This means an economical disadvantage. Moreover, there are other problems, for example the lubricant scatters during processing and thus deteriorates the working environment.

Therefore, surface-treated steel or metal coated steel having a coating film showing lubricating and rust inhibiting functions as formed on the steel plate surface without using any lubricant have been proposed in recent years for resources saving, cost reduction, working environment improvement and other purposes.

Japanese Kokai Publication Hei-5-39458 discloses a technology for improving the press formability, among others, by forming a resin coating film consisting of a specific polyethylene wax on the steel plate surface. Japanese Kokai Publication Hei-1-301332 discloses a technology for attaining formability by doubly coating with a chromate film having a specific composition and a resin film consisting of a specific resin mixture.

From the labor saving viewpoint, Japanese Kokai Publication Hei-3-270932 discloses a technology concerning a lubricating and rust inhibiting coating composition capable of allowing close adhesion of a lubricating coating film to top coat films and rendering said coating film resistant to corrosion, hence enabling application of a top coat paint directly after shaping processing and, further, in applications where electro deposition coating of steel plates for automobiles and the like is required, capable of having electric conductivity necessary for coating.

The use of an organic solvent in the production of such lubricating and rust inhibiting coating compositions offers certain problems, for example worsening of the working environment during processing, the risk of combustion or ignition, and requirement of an afterburner for avoiding solvent discharge. Therefore, water-based coating compositions in which no organic solvent is used have been developed. In such water-based coating compositions, the hydrophilic group content of the resin is increased for rendering the compositions water-based and/or an emulsifier or the like is incorporated for emulsification of the resin. However, these measures result in promoted penetration of water, which leads to decreased water resistance and corrosion resistance. Thus, technical means have been demanded for preventing the water resistance and corrosion resistance from decreasing even when the compositions are made water-based.

Further, in the field of corrosion preventing paints in general, paints with adjusted electric conductivity have been developed for increasing the water resistance and humidity resistance of paint films (Japanese Patent Application Hei-4-290339).

In cases where any of the water-based coating compositions mentioned above is used as a rust preventive primer composition to form a primer layer with an ordinary film thickness and said layer is overcoated with a water-based paint in a wet on wet manner, followed by baking by the two coat one bake coating method, the primer layer tends to show insufficient hardening or cure, causing such problems as decreased humidity resistance, water resistance and corrosion resistance, unless high-temperature and long-duration baking conditions are applied to the primer layer.

In recent years, energy saving and high-speed treatment have been promoted in commercial-scale surface-treated steel or metal coated steel production lines. Only those compositions which can be hardened at a relatively low temperature in the order of 150° C. within a short time of about 15 seconds to secure the coating film strength characteristics can meet the needs under the existing circumstances.

Furthermore, deep drawing and high-speed processing are recent trends. In such processes, the coating film in the processed portion of a surface-treated steel or metal coated steel peels off due to the use of a mold at an elevated temperature, giving a powder (powdering). This powder adheres to the processed portion and mold, posing such problems as decreased processability due to bites and the like, decreased corrosion resistance, and injured finished product appearance.

The steps of application and baking of water-based lubricating and rust inhibiting coating compositions are conducted in a coil coating line. In such a coil coating line, the line speed is temporarily reduced from time to time, for example on the occasions of line troubles, strip sheet exchange, and paint or coating composition exchange. In such cases, the substrate, for example the coated steel plate for household electric appliances, stays in a constant-temperature oven for a certain period of time and, as a result, experiences an overbaked state. In the later rebaking step in the top coat coating process, the degree of hardening may become excessive, finally causing deterioration in adhesion and bending processability in certain instances. Thus, technical means are required for avoiding such deterioration in adhesion and bending processability even if an overbaked state is brought about.

On the other hand, separately from the water-based lubricating and rust inhibiting coating compositions detailed mentioned above, dry-inplace rust inhibiting coating compositions are used for direct application to the steel or metal coated steel surface. The word "dry-inplace" means the coating type wherein the coating composition can be applied uniformly by roll-coater and without washing with water. In the zinc phosphating (hereinafter referred to "chemical conversion") step employed in such steel plate surface treatment for surface preparation for coating, sludge formation is unavoidable. In view of recent increasing concern about environment problems, waste disposal problems and the like, the cost for the disposal of the byproduct sludge formed in the chemical conversion step is increasing, hence it is desirable to have a sludgeless chemical conversion process.

From the cost reduction viewpoint as well, not only the above-mentioned cost for sludge disposal but also the maintenance cost for sludge treatment such as separation, aggregation and precipitation should desirably be reduced. Furthermore, a large space is necessary for chemical conversion treatment and this creates a demand for space saving. In view of this and also from the view-point of avoiding the complicated control of the chemical conversion line liquid regarding pH and acidity, for instance, a method of surface treatment for preparation for coating which can replace the chemical conversion type zinc phosphating is earnestly desired.

As a surface treatment for preparation for coating which can serve as a substitute for the zinc phosphating, dry-inplace chromate treatment and reaction type chromate treatment have been put into practical use and these solve the problems mentioned above concerning substrate surface properties such as corrosion resistance and adhesive property, space saving in the treatment step and the like. However, the chromate treatment mentioned above involves hexavalent chromium or chromate and therefore waste liquid discharge is regulated from the standpoints of occupational safety and health, working environment, environmental protection and the like, offering problems, for example the cost of waste liquid treatment.

Various nonchromium type treatment agents avoiding the use of hexavalent chromium have been proposed. However, when used in substrate treatment for preparation for coating of carbon steel and galvanized steel, they impair the corrosion resistance. Therefore, they are now applied only in certain specific fields such as posttreatment following chemical conversion treatment, and aluminum can treatment.

Accordingly, investigations were made in an attempt to find out a composition capable of functioning as a dry-inplace water-based rust inhibiting coating composition for preparation for coating while avoiding the necessity of sludge treatment and waste liquid treatment in zinc phosphating and improving the space efficiency, further capable of retaining corrosion resistance even in the absence of chromate treatment on the galvanized steel and at the same time capable of functioning as a lubricating and rust inhibiting coating composition giving lubricating ability and as a lubricating and rust inhibiting coating composition for automobiles. As a result, it was found that when a composition comprising (a) 100 parts by weight, on the solid content basis, of a phosphoric acid-modified bisphenol-type epoxy resin having an acid value due to the phosphoric acid group of 5 to 35 and (b) 10 to 500 parts by weight, on the solid content basis, of at least one member selected from the group consisting of oxazoline compounds, phenol resins, and melamine resins having a hardening initiation temperature of not higher than 140° C. is supplemented with (c) 0.1 to 5% by weight, based on the whole solid content of the composition mentioned above, of at least one acidic catalyst selected from the group consisting of benzene sulfonic acid derivatives, amine salts and ammonium salts thereof, naphthalenesulfonic acid derivatives, amine salts and ammonium salts thereof, acidic amine salts and ammonium salts of phosphoric acid, and phosphonic acid derivatives, amine salts and ammonium salts thereof, the above objects can be accomplished, and such composition comprising (a), (b) and (c) was proposed.

Dry-inplace rust inhibiting coating compositions based on the above-mentioned water-based coating composition comprising (a), (b) and (c) satisfactorily functioned in rust preventive treatment of steel plates, galvanized steel plates and the like for preparation for coating. When used in lubricating and rust inhibiting treatment of galvanized steel plates, they provided satisfactory corrosion resistance, whether chromate treatment was performed or not.

However, unless the curing reaction is allowed to proceed to a sufficient extent under baking conditions of 130° and 5 minutes or longer, the dry-inplace rust inhibiting coating compositions mentioned above hardly performed said functions. Thus, they hardly perform their functions to a satisfactory extent under forced drying conditions of 60° to 110° and a period within several minutes that are generally used in substrate treatment of preparation for coating such as chemical conversion treatment or dry-inplace chromate treatment or under short-period baking conditions of 150 and within 15 seconds that are generally employed in lubricating and rust inhibiting treatment.

OBJECTS OF THE INVENTION

Accordingly, it is an object of the present invention to provide a water-based coating composition for the steel or metal coated steel surface treatment which gives coating films firmly adhering to metal plates and showing a high degree of hardening as well as excellent corrosion resistance, water resistance and weldability upon baking under low-temperature short-period conditions, has electric conductivity suited for electrodeposition coating and provides lubricating property in processing to thereby prevent powdering during processing as well as a method of forming coating films using said composition. Another object is to provide a water-based coating composition for use as a primer which when baked by the two coat one bake coating method under the same baking conditions as used in the case of one coat, can be hardened to a sufficient extent to give a primer coat excellent in water resistance and corrosion resistance.

A further object of the present invention is to provide a modification of the water-based coating composition for steel plate surface treatment which gives coating films firmly adhering to metal plates and showing a high degree of hardening as well as excellent corrosion resistance, water resistance and weldability upon baking under low-temperature short-period conditions, has electric conductivity suited for electrodeposition coating and provides lubricating property in processing to thereby prevent powdering during processing which modification can give coating films showing no decrease in adhesion and bending processability after top coating even when they have experienced an overbaked state, as well as a method of forming coating films using said modification.

A still further object of the present invention is to provide a modification of the water-based coating composition for steel plate surface treatment which gives coating films firmly adhering to metal plates and showing a high degree of hardening as well as excellent corrosion resistance, water resistance and weldability upon baking under low-temperature short-period conditions, has electric conductivity suited for electrodeposition coating and provides lubricating property in processing to thereby prevent powdering during processing which modification can perform its functions even under forced drying conditions or short-time baking conditions and can be used for dry-inplace rust inhibiting coating for substrate treatment for preparation for coating and for lubricating and rust inhibiting coating, as well as a method of forming coating films using said modification.

SUMMARY OF THE INVENTION

In a first aspect thereof, the present invention consists in a water-based coating composition which comprises 100 parts by weight, on the solid content basis, of a resin varnish (1) comprising at least one of water-soluble alkyd resins and water-soluble acrylic resins, each having an acid value of 25 to 100, a hydroxyl value of 35 to 200 and an SP value of 10.0 to 11.0, 10 to 200 parts by weight, on the solid content basis, of a hardener (2) comprising at least one of oxazoline compounds, and melamine resins having a hardening initiation temperature of not higher than 140° and 0.5 to 5 parts by weight, on the solid content basis, of an acidic catalyst (3) comprising at least one member selected from the group consisting of benzenesulfonic acid derivatives, amine salts and ammonium salts thereof, naphthalenesulfonic acid derivatives, amine salts and ammonium salts thereof, and acidic amine salts and ammonium salts of phosphoric acid, and in that a rust inhibiting primer composition, a water-based rust inhibiting coating composition, a water-based lubricating and rust inhibiting coating composition and a water-based lubricating and rust inhibiting coating composition for automobiles are constituted based on the water-based coating composition mentioned above.

In a second aspect thereof, the present invention consists in that a water-based coating composition is constituted by incorporating, into the water-based coating composition in accordance with the first aspect of the present invention, 10 to 80% by weight, on the solid content basis, based on the solid matter of said composition, of a polyurethane resin emulsion.

In a third aspect thereof, the present invention consists in a water-based coating composition comprising 100 parts by weight, on the solid content basis, of a polyurethane resin emulsion and 5 to 100 parts by weight, on the solid content basis, of an aqueous phenol resin.

BRIEF DESCRIPTION OF THE DRAWINGS

FIGS. 3A–3B illustrates reference standards for evaluating blistering.

DETAILED DESCRIPTION OF THE INVENTION

Figure 1:
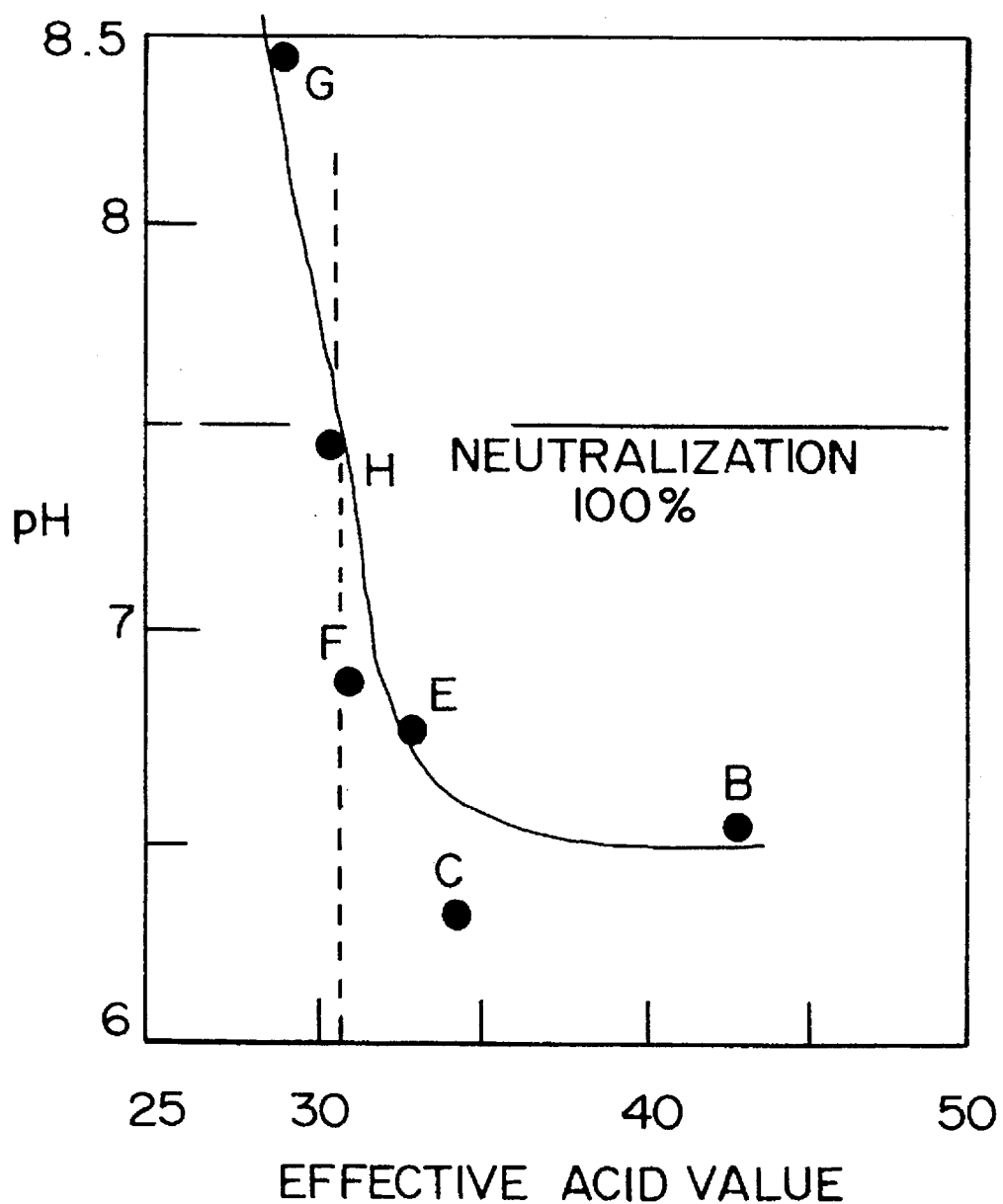
FIG. 1 graphically shows the relationship between the degree of solubilization of a water-soluble alkyd resin (B, C, E, F, G or H) and the effective acid value thereof. The ordinate indicates the pH required for effecting clarification and the abscissa indicates the effective acid value.

The composition in accordance with the first aspect of the present invention contains at least one of water-soluble alkyd resins and water-soluble acrylic resins. The water-soluble alkyd resins and water-soluble acrylic resins are not limited to specific species but include water-soluble alkyd resins such as fatty acid-modified phthalic acid alkyds and maleic acid type alkyds, and water-soluble acrylic resins such as (meth)acrylic acid esters, among others.

The composition in accordance with the first aspect of the present invention contains at least one of the water-soluble alkyd resins or at least one of the water-soluble acrylic resins, or both. The water-soluble alkyd resins and water-soluble acrylic resins mentioned above have an acid value (AV) of 25 to 100, a hydroxyl value (OHV) of 35 to 200 and an SP (solubility parameter) value of 10.0 to 11.0. When the water-soluble alkyd resins and/or water-soluble acrylic resins mentioned above have an acid value below 25, a hydroxyl value below 35, or an SP value below 10.0, the degree of solubilization in water (degree of hydrophilicity) is low and problems may be encountered in recovering the paint portions that have adhered to coating equipment and the like other than the substrates in the step of coating by causing said portions to be absorbed in water; for example, when the recovered dilute paint is concentrated by ultrafiltration, the resin may separate out. When the acid value exceeds 100, the hydroxyl value exceeds 200, or the SP value exceeds 11.0, the degree of solubilization in water (degree of hydrophilicity) becomes too high, impairing the water resistance and other properties of coating films. Accordingly, said values should be within the respective ranges mentioned above.

The water-soluble alkyd resins and water-soluble acrylic resins mentioned above preferably have a hydroxyl value within the range of 100 to 200. When the hydroxyl value is below 100, the paint portions that have adhered to coating equipment and the like other than the substrates in the step of coating can no longer be easily washed off with water and, further, the adhesion of dry coating films to substrates decreases, so that peeling tends to occur during processing under lubricating conditions created by the composition and the wet adhesion tends to decrease, hence the corrosion resistance tends to decrease.

The SP value mentioned above is called solubility parameter and serves as a measure of solubility or compatibility. It can be calculated by the method described by Sub, Clarke in J. Polymer Science, A-1, vol. 5, pages 1671–1681 (1967).

Thus, 0.5 g of a resin sample is weighed in a 100-ml beaker at a measurement temperature of 20° C., 10 ml of a hydrophilic solvent is added using a whole pipette, and dissolution is effected using a magnetic stirrer.

Dioxane and acetone are used as hydrophilic solvents, and n-hexane and deionized water as hydrophobic solvents. The turbidity point is determined by adding dropwise a hydrophobic solvent using a 50-ml burette. The point where turbidity occurs is recorded as the amount of drops required.

The SP value $\delta$ of a resin can be calculated as follows:

$$\delta = (V_{m1}^{1/2} \delta_{m1} + V_{mh}^{1/2} \delta_{mh})/(V_{m1}^{1/2} + V_{mh}^{1/2})$$

$$V_m = V_1 V_2/(\phi_1 V_2 + \phi_2 V_1)$$

$$\delta_m = \phi_1 \delta_1 + \phi_2 \delta_2$$

$V_i$ : molar volume of the solvent (ml/mol), $\phi_i$ : volume fraction of each solvent at the turbidity point, $\delta_1$: SP value of-the solvent, ml : low SP value hydrophobic solvent mixture system, mh : high SP value hydrophobic solvent mixture system.

The water-soluble alkyd resins and water-soluble acrylic resins mentioned above are preferably those that when theoretically 100% neutralized, diluted to a nonvolatile content of 3% by weight and then concent rated to a nonvolatile content of 20% by weight by ultrafiltration (UF), give a filtrate containing resin components in an amount of not more than 4% by weight of the original resin. The resin components in the filtrate mentioned above includes unreacted low-molecular-weight acid components remaining in the resin through the process of synthesis, low-molecular-weight acid components formed by hydrolysis during storage of the varnish or water-based coating composition.

When the resin components in the filtrate mentioned above is not more than 4% by weight, good water resistance can be obtained. For that purpose, it is possible to select resins containing least possible proportions of readily water-soluble low-molecular-weight components or use resins synthesized spending a sufficiently long reaction time to render the components of low-molecular-weight components as small as possible.

Conventional water-soluble resins that are not ones particularly prepared to reduce the low-molecular-weight components content can also be used since when they are diluted by dissolution or dispersion and concentrated by ultrafiltration, reverse osmosis or the like method, the low-molecular-weight components are removed with the solvent. From the filtration efficiency viewpoint, the ultrafiltration method is preferred.

When the water-soluble alkyd resins and water-soluble acrylic resins mentioned above are theoretically 100% neutralized, then diluted to a nonvolatile content of 3% by weight and concentrated to a nonvolatile content of 20% by weight by ultrafiltration, the concentrated and recovered resin varnishes shows an acid value substantially representing the acid value due to carboxyl groups bound to the resin polymer. This value is defined as "effective acid value" in the present specification.

For collecting those portions of the paint that have failed to adhere to the substrate in spray coating of said substrate with the composition according to the first aspect of the present invention in aqueous washings in the booth and then recovering the paint components from the recovered water by ultrafiltration, the water-soluble alkyd resins and water-soluble acrylic resins mentioned above should preferably have an effective acid value of 31 to 100.

When the water-soluble alkyd resins and water-soluble acrylic resins are adjusted to an effective acid value of 31 to 100 and a hydroxyl value of 100 to 200, the hydration stability of these resins is improved. At the same time, the washing off of the paint portions that have adhered to the coating equipment and the concentration and recovery, by ultrafiltration, of the diluted paints recovered in booth water from oversprayed paint portions in spray coating become easy. When the water-soluble alkyd resins have an oil length of 5 to 45% and the melamine resin selected has an SP value of 9.5 to 10.9, the resulting water-soluble alkyd resin-melamine mixtures show good stability in water and, accordingly, they can be recovered smoothly by ultrafiltration.

In the water-based coating composition in accordance with the first aspect of the present invention, the hydration stability and the reactivity with the oxazoline compound can be maintained by restricting the acid value of the water-soluble alkyd resins and water-soluble acrylic resins to the specified range. Further, as a result of the restriction of the resins mentioned above with respect to their hydroxyl value, the hydration stability and the reactivity with the melamine resins as well as the adhesion to metal substrates can be maintained and firmly adhering coating films can be realized. Thus, the corrosion resistance and high-level processability (resistance of processed portions to peeling) can be maintained.

The composition in accordance with the first aspect of the present invention contains, as a hardener, at least one of oxazoline compounds and melamine resins.

The above-mentioned oxazoline compounds have a structure represented by the following general formula [I]. The oxazoline compounds readily react with a carboxyl-containing compound to undergo the ring opening addition reaction as shown below.

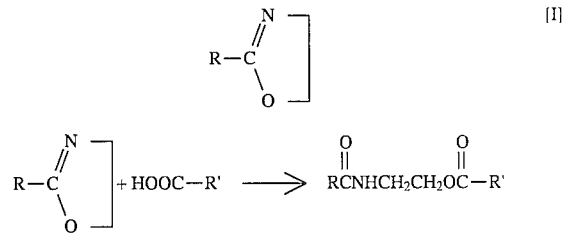

In the above formula, R and R' each is any of various polymers.

In accordance with the first aspect of the present invention, those compounds in which R is a styrenic polymer or an acryl-styrene copolymer are preferred since they give tough coating films and increase the glass transition temperature (hereinafter, "Tg").

The oxazoline compounds mentioned above preferably have a Tg of not lower than 0° C. When Tg is below 0° C., coating films excellent in adhesion to steel plates and in degree of hardening cannot be obtained under low-temperature and short-time baking conditions (about 15 seconds at 150° C.).

Said oxazoline compounds are not limited to any particular species but includes, among others, Nippon Shokubai Kagaku Kogyo's Epocross K-1010E, Epocross K-1020E, Epocross K-1030E and Epocross K-1050E. Among these, Epocross K-1030E and Epocross K-1050E have a high Tg and give coating films with high adhesion and high toughness, hence are preferred. Epocross K-1010E and Epocross K-1020E can also be used when the addition level, hardening temperature and catalyst are adjusted or selected so that the resulting coating films can have desired characteristics.

The oxazoline compounds mentioned above react with the carboxyl groups of the water-soluble alkyd resins or water-soluble acrylic resins to form crosslinks and give tough coating films even by short-time baking, whereby corrosion resistance and high-level processability can be expressed.

The melamine resins mentioned above have a hardening initiation temperature of not higher than 140° C. The hardening initiation temperature as so termed in the present specification is the temperature read from the point of a curve constructed by plotting, against the temperature, the Er (relative dynamic modulus) as measured by the DSA (dynamic spring analysis) method at a programmed rate of temperature rise of 3° C./minute. On this occasion, an alkyd resin with an acid value of 39 and a hydroxyl value of 140 is used and a naphthalenesulfonic acid-based acidic catalyst is used. The proportions of the alkyd resin and melamine resin mentioned above is 7:3 on the solid basis and the catalyst mentioned above is used in an amount of 2 parts by weight per 100 parts by weight, on the solid basis, of the alkyd resin-melamine resin mixture. When a melamine resin having a hardening initiation temperature higher than 140° C. is used, the coating films attain an insufficient degree of hardening under low-temperature short-period baking conditions. The above range is thus critical.

As for the concentration and recovering, by ultrafiltration, of the diluted paints recovered in booth water from oversprayed paint portions in spray coating, selecting the melamine resins having an SP value of 9.5 to 10.9 makes the resulting water-soluble alkyd resin and melamine mixtures show good stability in water and, accordingly, they can be recovered smoothly. As the melamine resins mentioned above, there may be mentioned, among others, methoxy-modified melamine resins such as Cymel 303 (Mitsui-Cytec), Sumimal 50 W (Sumitomo Chemical Industry); methoxy-butoxy-modified melamine resins such as Cymel 236, Cymel 238 and Cymel 235 (Mitsui-Cytec); butoxy-modified melamine resins such as Mycoat 506 (Mitsui-Cytec).

On the other hand, as melamine resins used for a water-based rust inhibiting coating composition, a water-based lubricating and rust inhibiting coating composition for automobiles, imino- or methylol-modified or mixedly modified melamine resins are preferred. Butoxy-modified melamine resins are not preferred since they are poor in uniform miscibility with the water-soluble resins and cause a decrease in paint stability. As the above-mentioned melamine resins, there may be mentioned, among others, imino type melamine resins such as Cymel 327 and Cymel 328 (Mitsui-Cytec); methylol-modified melamine resins such as Cymel 370 (Mitsui-Cytec); and mixedly modified melamine resins derived from these such as Cymel 701 (Mitsui-Cytec).

The combined use of the above-mentioned melamine resins and the above-mentioned oxazoline compounds makes it possible to form firmly adhering coating films as a result of the hardening reaction of the melamine resin hydroxyl groups with the water-soluble alkyd and water-soluble acrylic resin hydroxyl groups and the oxazoline compound with carboxyl groups of said resin, respectively.

At least one of the oxazoline compounds and melamine resins mentioned above is used in an amount of 10 to 200 parts by weight, based on the solid content basis, per 100 parts by weight, on the solid basis, of at least one of the water-soluble alkyd and water-soluble acrylic resins. At addition levels exceeding 200 parts by weight, the hardener may remain unreacted, causing softening of the hardened coating films, decrease in Tg, decrease in adhesion, decrease in water and corrosion resistance and the like. At addition levels below 10 parts by weight, insufficient hardening will result. Thus, the above range is critical. Preferred addition levels are 20 to 100 parts by weight.

The composition in accordance with the first aspect of the present invention contains at least one acidic catalyst selected from the group consisting of benzenesulfonic acid derivatives, amine salts and ammonium salts thereof, naphthalenesulfonic acid derivatives, amine salts and ammonium salts thereof, and acidic amine salts and ammonium salts of phosphoric acid.

The counter cation in the acidic catalyst mentioned above is preferably an amine cation or the ammonium ion, since these ions evaporate on the occasion of heating for hardening and hardly remain in the coating films. Alkali metal ions and other metal cations are ionized in the paints and remain in the coating films to cause water absorption, hence are not preferred.

As examples of the acidic catalyst mentioned above, there may be mentioned dodecylbenzenesulfonic acid, dinonylnaphthalenesulfonic acid, ammonium dihydrogen phosphate, ammonium monohydrogen phosphate, Catalyst 500 (Mitsui-Cytec), Catalyst 600 (Mitsui-Cytec) and Catalyst 4040 (Mitsui-Cytec), among others.

The addition level of the above-mentioned acidic catalyst is 0.5 to 5 parts by weight, on the solid content basis, per 100 parts by weight, on the solid content, of at least one of the water-soluble alkyd resins and water-soluble acrylic resins mentioned above. At levels below 0.5 part by weight, the catalytic activity is low, hence short-period or low-temperature hardening is difficult while, at levels exceeding 5 parts by weight, a large portion of the catalyst remains in the films and impairs the water resistance. The range mentioned above is thus critical.

The water-based coating composition in accordance with the first aspect of the present invention can be used, either as such or after addition of one or more appropriate additives, as a rust inhibiting primer composition, a water-based rust inhibiting coating composition, a water-based lubricating and rust inhibiting coating composition or a water-based lubricating and rust inhibiting coating composition for automobiles.

For preparing the rust inhibiting primer composition or water-based rust inhibiting coating composition mentioned above, at least one of rust preventive pigments having an electric conductivity of not more than 600 μS/cm as measured for an aqueous dispersion prepared by dispersing 1 g of pigment in 100 g of deionized water, and finely divided silica is added to the above-mentioned water-based coating composition. The addition level is 1 to 40 parts by weight, on the solid content basis, per 100 parts by weight of the sum of the resin varnish(es) and hardener(s). At levels below 1 part by weight, the pigment cannot produce its effect as pigment. At levels exceeding 40 parts by weight, the effects of the first aspect of the present invention cannot be produced.

As said rust preventive pigment, there may be mentioned, among others, phosphate rust preventive pigments such as calcium phosphate (e.g. Kikuchi Color & Chemicals' LF Bosei CP-Z) and zinc phosphate; molybdate rust preventive pigments such as zinc molybdate (e.g. Kikuchi Color & Chemicals' LF Bosei M-PSN, Honjo Chemical's Moriwhite 101); and zinc calcium cyanamide (e.g. Kikuchi Color & Chemicals' LF Bosei ZK-S2).

Although calcium plumbate, silica phosphate, zinc chromate, strontium chromate, barium metaborate and the like may also mentioned as rust preventive pigments having an electric conductivity exceeding 600 μS/cm, these pigments impair not only the water resistance and blistering resistance of coating films but also the stability of the water-soluble alkyd resins and water-soluble acrylic resins and therefore cannot be used in practicing the first aspect of the present invention.

Lead-based rust preventive pigments such as basic lead sulfate and lead cyanamide are toxic and therefore cannot be used in practicing the first aspect of the present invention except for certain special cases.

When the above-mentioned water-based coating composition of the present invention has an effective acid value of 31 to 100, a composition prepared by supplementing said water-based coating composition with a rust preventive pigment having an electric conductivity of not more than 100 μS/cm as added in an amount of 1 to 10 parts by weight, on the solid content basis, per 100 parts by weight of the sum of the resin varnish and hardener is more preferred as a rust inhibiting primer composition.

As examples of the above-mentioned rust preventive pigment with an electric conductivity of not more than 100 μS/cm, there may be mentioned zinc phosphate (Kikuchi Color & Chemicals' LF Bosei ZP-53Z, LF Bosei ZP-ZPF) and aluminum tripolyphosphate (Tayca Corporation's K White), among others.

usable as the above-mentioned silica are those species that are in finely divided form or in colloidal form such as sols and generally used in rust inhibiting paints, in particular thin-film type rust inhibiting coating compositions for the steel or metal coated steel. Among them, however, those neutral or alkaline dry-process or wet-process silica species that give an aqueous dispersion having a pH of 7 to 11 are preferred.

Many of dry-process silica species have an equi-acid-base point in the acidic range of pH 4 to 5. Such silica species tend to lower the pH of the aqueous resin solution, so that the resin does not become water-soluble but turns into a dispersion form, unfavorably leading to impairment of the storage stability of the water-based coating composition in cases where said composition is designed to remain weakly alkaline. This does not apply to those cases where the water-based coating composition is designed to have weak acidity.

As the wet-process silica species mentioned above, there may be mentioned those colloidally stabilized in water, such as Snowtex O (Nissan Chemical Industries), Snowtex N (ditto), Adelite AT-20 (Asahi Denka Kogyo), Adelite AT-30 (ditto), Adelite AT-40 (ditto), Adelite AT-50 (ditto), Adelite AT-20S (ditto), Adelite AT-30S (ditto), Adelite AT-20N (ditto), Adelite AT-20A (ditto) and Adelite AT-30A (ditto).

The silica to be used in the practice of the first aspect of the present invention is preferably in a colloidal form attained by using a colloidizing agent. The colloidized silica particles are composed mainly of dry-process silica or dry-process aluminum silicate and are preferably of high purity without containing contaminant ions. As the dry-process silica, there may be mentioned the so-called fumed silica, such as Aerosil 380 (Nippon Aerosil), Aerosil 300 (ditto) and Aerosil 200 (ditto), for instance. As the dry-process aluminum silicate, there may be mentioned Aerosil MOX170 (Nippon Aerosil), Aerosil MOX80 (ditto), Aerosil COK84 (ditto) and the like. Aluminum silicate can be colloidized more efficiently than silica alone.

In the colloidization, the dry-process silica or dry-process aluminum silicate is used preferably in an amount of 50 to 200 parts by weight per 1,000 parts by weight of the whole mixture including water. When it is used in an amount smaller than 50 parts by weight, colloidized particles tend to undergo reaggregation, leading to a decrease in the corrosion resistance of coating films formed by the water-based coating composition containing the colloidized particles. At an addition level exceeding 200 parts by weight, the corrosion resistance of coating films formed by the water-based coating composition containing the colloidized particles obtained tends to decrease. An addition level of 100 to 150 parts by weight is preferred.

The colloidizing agent or aid to be used in the above colloidization is not limited to any particular species but includes those compounds which form a large anion in aqueous solution, for example phosphoric acid compounds such as pyrophosphoric acid, tripolyphosphoric acid, tetrapolyphosphoric acid, pentapolyphosphoric acid, hexapolyphosphoric acid, heptapolyphosphoric acid, octapolyphosphoric acid, nonapolyphosphoric acid, decapolyphosphoric acid, metaphosphoric acid, trimetaphosphoric acid, hexametaphosphoric acid, ultrapolyphosphoric acid, like condensed phosphoric acids, and ammonium salts of these and the like.

Alkali metal or alkaline earth metal salts of condensed phosphoric acids are included as well in the category of salts of condensed phosphoric acids. However, the use of these is not preferred since metal ions, if contained in the coating films, will promote the coating film permeation of halogen ions (e.g. $Cl^-$) in a corrosive atmosphere and further inhibit the cation exchanging ability of silica, whereby the corrosion resistance of the coating films formed by the water-based coating composition containing the colloidized particles obtained will be remarkably reduced.

As further examples of the colloidizing agent, there may be mentioned molybdic acid compounds such as ammonium molybdate tetrahydrate; boric acid compounds such as ammonium pentaborate and metaboric acid; and silicic acid compounds such as orthosilicic acid and metasilicic acid. Although the silicic acid compounds are slightly soluble in water, they can be used after dissolution in an ammonium-alkaline solution. Sulfur-containing anions can also be used in colloidization, though they are chemically active against oxidation-reduction reactions.

The addition level of the colloidizing agent or aid is not limited to a particular level but may be adjusted depending on the particle size desired of the colloidized particles. Thus, for instance, for attaining a colloidized particle size of not greater than 500 nm, the agent is added preferably in an amount of $2 \times 10^{-4}$ to $2 \times 10^0$ moles relative to silica or aluminum silicate. When the addition level is below $2 \times 10^{-4}$ moles, the colloidized particles once obtained will aggregate and return to network structure particles to become coarse. At an addition exceeding $2 \times 10^0$ moles, the corrosion resistance of the coating films formed by the water-based coating composition containing the colloidized particles then obtained shows a tendency toward decrease. A more preferred addition level is within the range of $2 \times 10^{-3}$ to $2 \times 10^{-2}$ moles.

The dispersion medium water for the colloidized particles mentioned above is preferably deionized water or pure water or the like as contaminant-free as possible.

The particle size of the thus-obtainable colloidized particles can be adjusted to a desired value by adjusting the level of addition of the colloidizing agent. For the addition to a water-based coating composition for organic coating of high-corrosion-resistant precoated steel plates, a size of not greater than 500 nm is preferred and a size within the range of 150 to 250 nm is more preferred.

When a water-based lubricating and rust inhibiting coating composition is to be prepared based on the water-based coating composition in accordance with the first aspect of the present invention, a wax is preferably added to the water-based rust inhibiting coating composition mentioned above in an amount of 3 to 15 parts by weight, on the solid content basis, per 100 parts by weight, on the solid content basis, of said water-based rust inhibiting coating composition. When the wax is added at a level below 3 parts by weight, the processability under lubrication will be low. At a level exceeding 15 parts by weight, the adhesion to the top coat will become decreased.

The wax mentioned above is not limited to any particular species provided that it can be dispersed in water. Thus, it includes, among others, paraffin wax, microcrystalline wax, polyethylene waxes (e.g. polyethylene waxes having an average molecular weight of 2,000 to 8,000, such as Kusumoto Chemical's Disparlon SE210-15T and Disparlon SE480-10T, Mitsui Petrochemical's Chemipearl WF640 and Chemipearl W700 and the like), polypropylene waxes, and polybutene waxes. In addition to those mentioned above, use may be made of fluorine-containing solid lubricants such as polytetrafluoroe thylene, other fluororesins and fluorocarbons; graphite; metal soaps and the like that can be incorporated in the water-based compositions.

A water-based lubricating and rust inhibiting coating composition for automobiles in accordance with the first aspect of the present invention can be prepared by further adding a melamine cyanurate compound to the above-mentioned water-based rust inhibiting coating composition which contains a wax.

The water-based lubricating and rust inhibiting coating composition for automobiles is preferably prepared by adding, to 100 parts by weight, on the solid content basis, of the above-mentioned water-based rust inhibiting coating composition, 2 to 10 parts by weight, on the solid content basis, of a wax and further adding 0.05 to 25 parts by weight, on the solid content basis, per 100 parts by weight, on the solid content basis, of the sum of these, of a melamine cyanurate compound. When the wax content is below 2 parts by weight, the lubricating ability during processing will be insufficient, while an amount exceeding 10 parts by weigh will lead to decreased adhesion to the top coat. When the melamine cyanurate compound content is below 0.05 part by weight, the effect of inhibiting the destruction of the adhesion on the substrate metal interface as resulting from voltage application on the occasion of electrodeposition coating disappears, as mentioned hereinafter. When said content exceeds 25 parts by weight, the coating films obtained are lacking in uniformity and fineness of texture and, in the case of thin-film coating, the barrier effect is impaired.

The wax mentioned above may be the same as the one to be used in the above-mentioned water-based lubricating and rust inhibiting coating composition.

The melamine cyanurate compound mentioned above is a compound having a isocyanurate ring-containing planar structure as represented by the formula $(C_6H_9N_9O_3)n$ and includes, for example, equimolar adducts between 2,4,6-triamino-1,3,5-triazine (hereinafter, "melamine") and 2,4,6-trihydroxy-1,3,5-triazine (hereinafter, "cyanuric acid") or the tautomeric isomer thereof. It is supposed that, in the solid state, melamine molecules and cyanuric acid molecules adjoin one another by weak hydrogen bonding to form a crystal having a planar structure such as shown below.

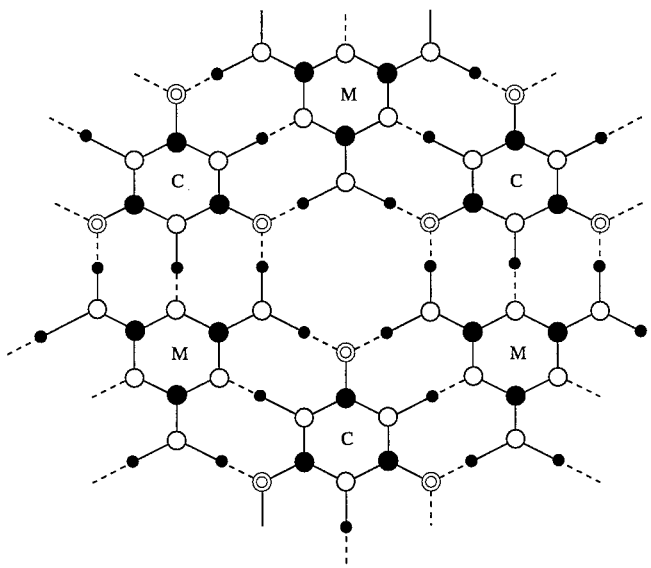

In the formula, ● denotes a carbon atom, o a nitrogen atom, ⊙ an oxygen atom, . a hydrogen atom, M a melamine molecule and C a cyanuric acid molecule.

It supposedly has a laminar structure with a certain definite distance between planes, that is the so-called graphite type structure, as shown below.

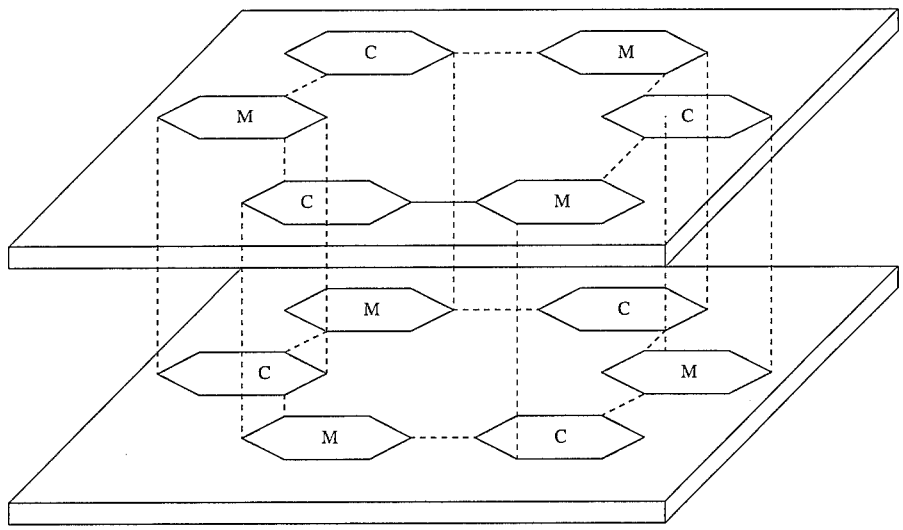

In the formula, M and C are as defined above.

As such melamine cyanurate compound, there may be mentioned, for example, those commercial products that are available from Nissan Chemical Industries under the MC-series designation (e.g. MC-FW, MC-PW, MC-BW, MC-UW, MC-420, MC-520, MC-600 and the like) for which a method of production is described in Japanese Kokoku Publication Sho-60-33850. Although Japanese Kokai Publication Hei-3-28277 discloses a method of producing the same pearlessence as in mica coating in metallic coating of automobiles and the like by adding a melamine cyanurate compound to the clear layer, this technology is irrelevant to the first aspect of the present invention.

The melamine cyanurate compound mentioned above has good acid resistance and alkali resistance and is stable in the pH range of 1 to 14 without undergoing any chemical change. Thus, in spite of the fact that, in cationic electrodeposition coating, electrodeposition coating substrates are exposed to a pH condition of about 12, the water-based lubricating and rust inhibiting coating composition of the first aspect of the present invention which contains the melamine cyanurate compound is effective in preventing the destruction of substrate metal interface adhesion which would otherwise be caused by the applied voltage in electrodeposition coating.

The melamine cyanurate compound mentioned above is hardly soluble in water and resistant to heat. Furthermore, it is insoluble in organic solvents generally used in paints and only soluble in dimethylsulfoxide to an extent of 0.011 g/100 ml at 70°. Therefore, it is not dissolved in the water penetrating beneath the coat film in the step of electrodeposition coating and therefore will not obstruct the process of electrodeposition coating.

The water-based coating composition in accordance with the first aspect of the present invention may contain, as a further ingredient or ingredients, one or more additives or the like, such as pigments, solvents and the like, at addition levels that are not incompatible with the constitution of the first aspect of the present invention.

Said pigments are not limited to particular species but include, for example, color pigments, body pigments and the like. As the color pigments, there may be mentioned, among others, titanium oxide, phthalocyanine blue, phthalocyanine green, quinacridone pigments, indanthrone pigments, perylene pigments, anthrapyrimidine pigments, carbon black, benzimidazolone pigments, graphite, yellow iron oxide, red iron oxide and the like. As the body pigments, there may be mentioned, for example, calcium carbonate, gypsum, clay, talc and the like.

The pigment content is preferably within the range of 0.5 to 30 parts by weight per 100 parts by weight, on the solid content basis, of the water-based coating composition.

As the solvents, there may be mentioned, for example, water; alcohols such as methyl alcohol, ethyl alcohol, isopropyl alcohol, butyl alcohol, isobutyl alcohol, 2-butyl alcohol, benzyl alcohol and cyclohexanol; ketones such as acetone, methyl ethyl ketone, methyl isobutyl ketone, cyclohexanone, isophorone and diacetone alcohol; other hydrophilic organic solvents; and mixtures of these.

The solvent addition level in the water-based coating composition is 50 to 80% by weight in the case of water and, in the case of a hydrophilic organic solvent, within the range of 0 to 80% by weight. Said solvent content is preferably adjusted to 20 to 50% by weight relative to the resin solids in the initial water-based coating composition as prepared and further to 10 to 20% by weight relative to the resin solids in the water-based coating composition ready for application.

As other additives, there may be mentioned, for example, antifoaming agents, leveling agents, crawling inhibitors, gloss improvers, precipitation inhibitors, wetting agents (surfactants), lubricants, preservatives and dust-proof agents.

The water-based coating composition in accordance with the first aspect of the present invention can be prepared in the conventional manner by mixing the components and ingredients mentioned above using a mixing device generally used in paint manufacture, such as paint shaker, Disper, ball mill, sand grind mill, kneader, or dissolver. The viscosity can be adjusted using water as a solvent. On that occasion, one or more hydrophilic organic solvents can be used in combination with water to an extent such that they will not cause demulsification.

The colloidized particles are added to the water-based coating composition mentioned above either in the process of production of the water-based coating composition (pre-addition) or to the finished water-based coating composition (postaddition). The addition level is within the range of 15 to 60 parts by weight, preferably 20 to 40 parts by weight, per 100 parts by weight of the resin solids in the water-based coating composition. When the level of addition of said colloidized particles is below 15 parts by weight, the corrosion resistance will be poor. At levels above 60 parts by weight, said water-based coating composition will have an excessively high viscosity to disturb the production process and, further, the roping phenomenon may occur in connection with the picking up property, unfavorably necessitating dilution.

The addition of the colloidized particles to the water-based coating composition can be performed using, for example a paint shaker, Disper, ball mill, sand grind mill, kneader or dissolver, such as mentioned above.

It is advantageous that prior to application of the water-based coating composition in accordance with the first aspect of the present invention to a substrate, the substrate metal plate be pretreated to render the material rustproof and improve the adhesion of the paint. The pretreatment includes not only the common degreasing treatment such as acid and alkali washing but also the chemical conversion treatment using a chemical conversion agent such as a phosphate or chromate. Particularly when the substrate is subjected to a series of such pretreatment steps, coating films excellent in adhesion and rust preventive effect can be found in a stable manner.

Coating film formation using the water-based coating composition in accordance with the first aspect of the present invention can be performed by applying said coating composition to a substrate pretreated in the above manner to a dry film thickness of 0.2 to 5µm, followed by baking.

The method of coating is not critical. Thus, ordinary coating methods such as air spray coating, airless spray coating and electrostatic coating can be used.

The baking is preferably carried out at 120° to 180° C. for 7 to 60 seconds. At a drying temperature below 120° C., the hardening by the melamine resin becomes insufficient and the corrosion resistance becomes worsened. At above 180° C., overbaking will result, tending to cause decreased processability and/or decreased adhesion to the top coat. A more preferred range is 140° to 150° C. A baking time shorter than 7 seconds causes insufficient curing, with the result that the coating films have poor corrosion resistance. A baking time longer than 60 seconds brings about a state of excessive curing and is disadvantageous from the production process viewpoint. More preferably the baking is carried out at 80° to 150° C. for 7 to 22 seconds, most preferably at 110° to 130° C. for 8 to 15 seconds.

The water-based lubricating and rust inhibiting coating composition and water-based lubricating and rust inhibiting coating composition for automobiles in accordance with the first aspect of the present invention, when diluted with water to an appropriate concentration, then applied to cold rolled steel sheets or plates, galvanized or electrogalvanized or like zinc-coated steel sheets, zinc alloy-coated steel sheets, aluminized steel sheets or the like by such a method as spray coating, shower coating, roll coating or dipping so that the dry coating film weight amounts to 0.3 to 5 g/m² and dried, can give the steel or metal coated steel surface-treated for lubrication and rust inhibition that have a coating film formed thereon with a dry film Tg of not lower than 40° C. and an elongation percentage of 2 to 6%.

The galvanized steel plates and other metal substrates coated with the water-based composition in accordance with the first aspect of the present invention can be further coated, as necessary, on the coating film thereon by the following method (A) or (B).

(A) The galvanized steel plates and other metal substrates having a coating film formed by the water-based coating composition according to the first aspect of the present invention is processed by bending or deep drawing and then subjected to further coating. The coating may comprise undercoating (primer coating) and the subsequent top coating, or, simply, top coating alone.

For improving the corrosion resistance, an under coat (primer coat) is desirably provided on the coating film formed. The primer coat protects the substrate against corrosive actions and provide the metal plate surface, surface treatment film and top coat film with adhering ability. The undercoat film thickness is generally 1 to 7 µm in a dry state. The baking is conducted in a short period of time under temperature and time conditions optimal for the coating resin used.

The top coat film preferably has a thickness of 7 to 50 µm (in a dry state). When this coat film is less than 7 µm in thickness, the tinting strength is in sufficient and therefore the undercoat material cannot be hidden. When the thickness is more than 50 µm, pinholes may possibly be formed in high-temperature short-time baking. The baking temperature and time are selected so that they are optimal for the top coat employed. After top coat application, bending, pressing or drawing is performed.

(B) On the coating film formed by the water-based coating composition according to the first aspect of the present invention, there is produced a coating by cationic or anionic electrodeposition to give a dry film thickness of 15 to 40 µm, if necessary followed by application of an alkyd resin-, polyester resin- or acrylic resin-based intermediate coat so as to give a dry film thickness of 20 to 60 µm. Then, an acrylic resin-, polyester resin- or fluororesin-based top coat generally used for automobiles can be applied.

In a further mode of practice, the above water-based coating composition is used to form a rust inhibiting primer layer having a conventional thickness (not less than 20 µm) and then a top coat is applied thereto. In that case, the top coat can be applied onto said rust inhibiting primer without baking the latter under ordinary conditions (e.g. 140° C., 20 minutes) (two coat one bake coating method).

The primer layer is preferably subjected to water evaporation at a temperature lower than the hardening temperature. The evaporation is preferably effected at a temperature of not lower than 50° C. for 3 minutes or longer. In this case, either a water-based paint or a solvent type paint can be used as the top coat.

As mentioned above, the top coat application can be performed without hardening the undercoat (ordinary wet on wet coating) and the primer layer and top coat layer both can be finished in only one baking step without insufficient hardening.

The coating system to be combined with the coating film formed by the water-based coating composition according to the first aspect of the present invention is not limited to the above-mentioned species. As regards the resin type, the organic solvent type, water-based type and powder type each can be employed.

The water-based coating composition according to the first aspect of the present invention can suitably be applied to steel plates or chromated or unchromated zinc- or zinc alloy-coated steel plates.

The water-based coating composition according to the first aspect of the present invention can suitably be applied to such substrates as automobile bodies; automobile parts; household electric appliances, for example rice cookers; stove housings, fuel tanks for stoves; various vessels or containers; and building materials, for example roofing materials, exterior materials and the like.

When the water-based coating composition according to the first aspect of the present invention is applied to steel plates, coatings showing good hardening and firm adhesion to the metal plates can be obtained by low-temperature short-time baking. The steel plates surface-treated with the above water-based coating composition are excellent in corrosion resistance, water resistance and the like, and have lubricating property, weldability and an electric conductivity suited for electrodeposition coating and, further, are prevented from powdering. The water-based coating composition according to the first aspect of the present invention can be used as a water-based lubricating and rust inhibiting coating composition or water-based lubricating and rust inhibiting coating composition for automobiles which is excellent in adhering property and provides lubricating property suited for high-level processing such as deep drawing as well as rust inhibiting property and, furthermore, can be used as a rust inhibiting primer composition in the wet-on-wet two coat one bake process.

In accordance with the second aspect of the present invention, a polyurethane resin emulsion is added to the water-based coating composition according to the first aspect of the present invention. As a result of the combined use of the polyurethane resin emulsion, the adhesion is improved and the top coat can be provided with good characteristics.

The polyurethane resin emulsion may be of the forced emulsification type in which an emulsifier is used or of the self-emulsifying type in which no emulsifier is used. In practicing the second aspect of the present invention, however, the use of a self-emulsifying polyurethane resin emulsion is preferred since said emulsion is free of such problems as strength changes and decreased water resistance caused by the remaining emulsifier. The self-emulsifying polyurethane resin emulsion has a gel structure and good emulsion stability against hydration and, in this sense as well, such emulsion is preferred in the practice of the second aspect of the present invention.

As the above-mentioned polyurethane resin emulsion, there may be mentioned polyether-based, polyester-based, polycarbonate-based ones and mixed types composed of these, depending on the raw materials. While any of these can be used, polyester-based polyurethane resins are preferred to polyether-based polyurethane resins, and polycarbonate-based polyurethane resins are more preferred, in view of the demand regarding the degree of hardening of hardened coating films.

As the polyether-based polyurethane resin emulsion, there may be mentioned, for examples, Superflex 110 (Daiichi Kogyo Seiyaku), Superflex F-8438D (Daiichi Kogyo Seiyaku) and Hydran HW950 (Dainippon Ink and Chemicals).

As the polyester-based polyurethane resin emulsions, there may be mentioned, for example, Superflex F-8123D (Daiichi Kogyo Seiyaku), Hydran HW910 (Dainippon Ink and Chemicals), Hydran HW920 (Dainippon Ink and Chemicals), Hydran HW930 (Dainippon Ink and Chemicals), Hydran HW940 (Dainippon Ink and Chemicals) and Hydran HW960 (Dainippon Ink and Chemicals).

As the polycarbonate-based polyurethane resin emulsions, there may be mentioned, for example, Superflex 460 (Daiichi Kogyo Seiyaku), Superflex F-8124D (Daiichi Kogyo Seiyaku), Hydran HW935 (Dainippon Ink and Chemicals) and Hydran HW980 (Dainippon Ink and Chemicals). These may be used either singly or combinedly as a mixture of two or more.

The polyurethane resin emulsions mentioned above preferably have a high molecular weight and a high Tg. The Tg of the polyurethane resin emulsions is preferably within the range of 10° to 80° C. When the Tg is within said range, coating films formed from the water-based coating composition according to the second aspect of the present invention can acquire desired levels of film strength and adhesion within a wide drying/baking temperature range of 120° to 180° C. A more preferred range of Tg is 20° to 80° C. In the practice of the second aspect of the present invention, a desired Tg can be obtained by mixing two or more of the various polyurethane resin emulsions mentioned above.

The content of the above polyurethane resin emulsion is 10 to 80% weight relative to the whole water-based coating composition mentioned above. When the content of the polyurethane resin emulsion is lower than 10% by weight, the coating films obtained will have poor adhesion and poor bending processability. At levels above 80% by weight, the corrosion resistance and lubricating property will be impaired. Thus, the above range is critical. A preferred range is 15 to 50% by weight.

The water-based coating composition according to the second aspect of the present invention can be used, either as such or after addition of an appropriate additive or additives, as a water-based rust inhibiting coating composition, a water-based lubricating and rust inhibiting coating composition or a water-based lubricating and rust inhibiting coating composition for automobiles.

In preparing said water-based rust inhibiting coating composition, it is preferable to add, to the water-based coating composition mentioned above, at least one member of the group consisting of rust preventive pigments having an electric conductivity of not higher than 600 μS/cm as measured for an aqueous dispersion prepared by dispersing 1 g of pigment in 100 g of water, and finely divided silica. The level of addition of said member is preferably 1 to 40 parts by weight, on the solid content basis, per 100 parts by weight, on the solid content basis, of said water-based coating composition. At levels below 1 part by weight, the pigment cannot produce its intended effect. At levels above 40 parts by weight, the effects of the second aspect of the present invention cannot be produced.

As the rust preventive pigments and silica, those mentioned in relation to the first aspect of the present invention can be used. Those colloidizing aids that are used in the first aspect of the present invention can be used as well.

In preparing a water-based lubricating and rust inhibiting coating composition based on the water-based coating composition according to the second aspect of the present invention, 3 to 15 parts by weight, on the solid content basis, of a wax is preferably added to 100 parts by weight, on the solid content basis, of the above-mentioned water-based rust inhibiting coating composition. When the wax addition level is below 3 parts by weight, the lubrication during processing will be low. When said level is above 15 parts by weight, the top coat adhesion will be insufficient.

The wax may be any of those that can be used in the practice of the present invention in accordance with the first aspect thereof.

When a melamine cyanurate compound is further incorporated in the above-mentioned water-based rust inhibiting coating composition supplemented with a wax, the water-based lubricating and rust inhibiting coating composition for automobiles according to the second aspect of the present invention can be obtained.

As the melamine cyanurate compound, there may be used any of those mentioned in relation to the first aspect of the present invention at the same addition level as in the first aspect of the present invention.

The water-based coating composition according to the second aspect of the present invention may further contain, as a further component or components, one or more of those pigments, solvents and other additives that can be used in the practice of the present invention in accordance with the first aspect thereof at the same addition levels as in the first aspect of the present invention unless said further components and addition levels are incompatible with the constitution of the second aspect of the present invention.

The water-based coating composition according to the second aspect of the present invention can be prepared in the conventional manner using any of the methods useful in the practice of the first aspect of the present invention.

It is advantageous that prior to application of the water-based coating composition according to the second aspect of the present invention to a substrate, the substrate metal plate be pretreated to render the material rustproof and improve the adhesion of the paint. Such pretreatment can be carried out in the same manner as in the first aspect of the present invention.

Coating film formation using the water-based coating composition according to the second aspect of the present invention can be carried out in the same manner as in the first aspect of the present invention.

Steel plates surface-treated for lubrication and rust inhibition and having a coating film formed thereon with a dry film Tg of not lower than 40° C. and an elongation percentage of 2 to 6% can be produced using the water-based lubricating and rust inhibiting coating composition or water-based lubricating and rust inhibiting coating composition for automobiles according to the second aspect of the present invention in the same manner as in the firs-t aspect of the present invention.

When necessary, the coating film on a metal material, such as a galvanized steel plate, as formed using the water-based coating composition according to the second aspect of the present invention may be further coated by the same method as in the first aspect of the present invention.

The coating system to be combined with the coating films formed by the water-based coating composition according to the second aspect of the present invention is not limited to those mentioned above. As for the resin type, the organic solvent type, water-based type and powder type can each be employed.

The water-based coating composition according to the second aspect of the present invention can suitably be applied to steel plates or chromated or unchromated zinc- or zinc alloy-coated steel plates.

The water-based coating composition according to the second aspect of the present invention can suitably be applied to such substrates as automobile bodies; automobile parts; household electric appliances, for example rice cookers; stove housings, fuel tanks for stoves; various vessels or containers; roofing materials, exterior materials and the like.

When the water-based coating composition according to the second aspect of the present invention is applied to steel plates, coatings showing good hardening and firm adhesion to the metal plates can be obtained by low-temperature short-time baking. The steel plates surface-treated with the above water-based coating composition are excellent in corrosion resistance, water resistance and the like, and have lubricating property, weldability and an electric conductivity suited for electrodeposition coating and, further, are prevented from powdering. The water-based coating composition according to the second aspect of the present invention can be used as a water-based lubricating and rust inhibiting coating composition or water-based lubricating and rust inhibiting coating composition for automobiles which is excellent in adhering property and provides lubricating property suited for high-level processing such as deep drawing as well as rust inhibiting property. Even when an overbaked state has been brought about, said composition will not lose the adhesion and bending process ability after top coat application.

The first component in the third aspect of the present invention is a polyurethane resin emulsion. Usable as said polyurethane resin emulsion are those to be used in the second aspect of the present invention.

The polyurethane resin emulsion preferably has a molecular weight of not less than 100,000. When the molecular weight is below 100,000, the desired film strength can hardly be obtained and the lubricating property during processing becomes decreased and, furthermore, the solvent resistance becomes low, so that when the coating film formed under low-temperature short-period forced drying conditions is subjected to top coat application after processing, the coating film is deteriorated by the solvent in the top coat or water, hence no corrosion resistance can be expected. The above problems disappear when the molecular weight is not less than 100,000, more preferably not less than several hundred thousand.

The second component in the third aspect of the present invention is an aqueous phenol resin. The aqueous phenol resin is not limited to any particular species. Thus, mention may be made of those produced by the methods disclosed in Japanese Kokai Publication Hei-4-283217, Japanese Kokai Publication Hei-5-93167 and so on; highly water-soluble resol type phenol resins such as Showa Highpolymer's Shownol BRL-125S and 126A; and the like; water-soluble resol type phenol resins such as Shownol BRL-117,134, 1583, 230C, 273Z, 2760, 280Z, 204,219, 1251, 2534, 113, 116, 120Z and 112A; aqueous emulsions such as BRE-174 and N-2, among others.

The above aqueous phenol resin gives, under the action of an acidic catalyst, tough and firmly adhering coating films even under such forced drying conditions as 60° to 110° C. and a period not longer than 1 minutes. Such coating films are excellent in corrosion resistance and processability.

The content of the above aqueous phenol resin is 5 to 100 parts by weight, on the solid content basis, per 100 parts by weight, on the solid content basis, of the above-mentioned polyurethane resin emulsion. When the content of said aqueous phenol resin is lower than 5 parts by weight, insufficient corrosion resistance will be obtained. When said content is more than 100 parts by weight, the stability of the polyurethane resin emulsion will be adversely affected. Thus, the above range is critical. A preferred range is 10 to 30 parts by weight on the solid content basis.

The composition according to the third aspect of the present invention preferably contains, as a third component, at least one member selected from the group consisting of oxazoline compounds, and melamine resins having a hardening initiation temperature of not higher than 140° C. Said oxazoline compounds may be those that can be used in the first aspect of the present invention. The oxazoline compounds readily react with a carboxyl-containing compound to undergo ring opening and addition reactions and therefore can be used in cases where one or more carboxyl-containing other components are used.

The oxazoline compounds to be used in the third aspect of the present invention preferably have a Tg of not lower than 40° C. When the Tg is below 40° C., coating films excellent in the adhesion to the steel or metal coated steel and in the degree of hardening can hardly be obtained under low-temperature short-period baking conditions (about 15 seconds at 150° C.). More preferably, the Tg should be not lower than 100° C.).

The melamine resins to be used as the third component in the third aspect of the present invention preferably have a hardening initiation temperature of not higher than 140° C. When the melamine resins have a hardening initiation temperature higher than 140 ° C., the containing films obtained will show an insufficient degree of hardening under low-temperature short-period baking conditions. Those that show a high rate of hardening are preferred among others.

Preferred as the melamine resins are imino- or methylol-modified or mixed modified, i.e. imino-methylol-modified, melamine resins. Butoxy-modified melamine resins are not preferred since they are poor in the uniform miscibility with the water-soluble resins and reduce the stability of the paints.

As the melamine resins meeting the above requirements, there may be mentioned, for example, imino type melamine resins such as Cymel 327 and Cymel 328 (Mitsui-Cytec); methylol-modified melamine resins such as Cymel 370 (Mitsui-Cytec); and mixedly modified melamine resins derived from these such as Cymel 701 (Mitsui-Cytec).

The content of the third component mentioned above is preferably 10 to 200 parts by weight per 100 parts by weight of the solids in the polyurethane resin emulsion, inclusive of 5 to 100 parts by weight of the aqueous phenol resin. When said content is smaller than 10 parts by weight, insufficient hardening will result. When the content exceeds 200 parts by weight, a portion of the hardener remains unreacted and causes softening of the hardened coating films, lowering of the Tg and decreases in adhesion, water resistance and corrosion resistance. More preferably, said content is 10 to 100 parts by weight.

Japanese Patent Application No. Hei-6-210460 describes that 100 parts by weight of the solids of a composition comprising a phosphoric acid-modified bisphenol type epoxy resin, a melamine or phenol resin and an acid catalyst is supplemented with 10 to 80% by weight of a polyurethane resin emulsion and used in application area where the film adhesion and bending processability are regarded as important and that the performance characteristics mentioned above cannot be obtained if the content of said polyurethane resin emulsion is below 10% by weight and, if said content is above 80% by weight, the corrosion resistance and lubricating property are lost. A more preferred range is 15 to 50% by weight.

On the other hand, the third aspect of the present invention is based on the technical idea that the use of 100 parts by weight of a polyurethane resin emulsion as a main component and the incorporation of 5 to 100 parts by weight of an aqueous phenol resin, as mention ed above, without the addition of any phosphoric acid-modified bisphenol type epoxy resin, can bring about the required corrosion resistance and make it possible to attain low-temperature short-time hardening under forced drying conditions at 60° to 110° C. for a period not longer than 1 minute.

The water-based coating composition of the third aspect of the present invention preferably contains, as a fourth component, at least one acidic catalyst selected from the group consisting of benzenesulfonic acid derivatives, amine salts and ammonium salts thereof, naphthalenesulfonic acid derivatives, amine salts and ammonium salts thereof, acidic amine salts and ammonium salts of phosphoric acid, phosphonic acid derivatives, amine salts and ammonium salts thereof.

The acidic catalyst mentioned above can act on the phenol resin or melamine resin and give coating films excellent in strength and adhesion under forced drying conditions of 60° to 110° C. and a drying time not longer than 1 minute and further give coating films at least comparable in toughness and adhesion to the prior art coating films under lower temperature and shorter hardening time conditions than the prior art hardening conditions (8 to 15 seconds at 150 ° C., 5 minutes at 130°C. ).

Although, in view of the characteristics of phenol resins, no acidic catalyst is particularly required under baking conditions of 120° to 180° C., the use of the acidic catalyst makes it possible to obtain coating films with a higher degree of hardening. In ordinary cases, a sufficient coating film strength can be obtained without using any acidic catalyst and in those cases the reduction in water resistance as otherwise resulting from the remainder of the acidic catalyst in the coating films can advantageously be avoided.

The salt-forming cation of the above-mentioned acidic catalyst may be any of those to be used in the practice of the present invention in accordance with the first aspect thereof.

Usable as the acidic catalyst mentioned above are those to be used in practicing the present invention in accordance with the first aspect thereof.

Among the acidic catalysts mentioned above, the acidic phosphoric acid includes not only the above-mentioned ammonium dihydrogen phosphate, ammonium monohydrogen phosphate and other inorganic phosphoric acid salts but also resins containing phosphoric acid groups bound thereto, for example phosphoric acid-modified polyvinyl alcohol and phosphoric acid-modified bisphenol type epoxy resins. When such resins are used, the low-molecular-weight acidic catalysts mentioned above need not be added or should be added only in very small amounts.

Polyvalent phosphoric acids such as phytic acid may also be used as the above-mentioned acidic phosphoric acids. In this case, such substances themselves have a rust inhibiting function in addition to the catalytic function and can intensify the corrosion resistance.

The phosphonic acid derivatives, amine salts or ammonium salts thereof to be used as the fourth component in the third aspect of the present invention are not phosphate esters but contain a direct bond between a carbon atom and the phosphorus atom. For reasons of their structure, the phosphonic acids are more resist ant to hydrolysis than phosphate esters, hence more referred for the purposes of the present invention in the third aspect thereof.

The phosphonic acid derivatives have a rust preventive effect and can intensify the corrosion resistance.

As the phosphonic acid derivatives, amine salts or ammonium salts thereof, there may be mentioned, for example, amine- or ammonia-neutralized Dequest 2000, bequest 2010 and bequest 2041 (Monsanto Japan) and the like.

The above-mentioned acidic catalyst is added preferably in an amount of 0.5 to 5 parts by weight, on the solid content basis, per 100 parts by weight of the solids in the water-based coating composition according to the third aspect of the present invention. At levels below 0.5 parts by weight, the catalytic action is insufficient, hence short-period or low-temperature hardening is difficult. At levels above 5 parts by weight, a large amount remains in the films and the water resistance is thereby decreased.

The aqueous dispersion of the water-based coating composition according to the third aspect of the present invention preferably has a pH of 7 to 10. When the pH is lower then 7, the aqueous phenol resin may undergo self condensation, impairing the storage stability of the composition. When the pH is above 10, the effect of the acidic acid is slight and the harden ability and storage stability become worsened.

In the third aspect of the present invention, those water-soluble alkyd resins to be used in the first and second aspects of the present invention may be added as a further component. However, use of this component may unfavorably lead to lowering of the Tg of the coating films formed, to failure to obtain tough and firmly adhering coating films and to failure to maintain the processability.

This lowering of Tg can be compensated by reacting the above-mentioned oxazoline compound with the carboxyl groups of the alkyd resin and selecting the oxazoline compound from among those having a high resin Tg. In this case, the oxazoline compound preferably has a Tg of not lower than 40° C., more preferably not lower than 100° C. The oxazoline compound preferably contains a styrenic polymer or styrene-acrylic copolymer.

The water-based coating composition according to the third aspect of the present invention can be used, either as such or after addition of one or more appropriate additives, as a water-based rust inhibiting coating composition for surface preparation for painting, a water-based lubricating and rust inhibiting coating composition or a water-based lubricating and rust inhibiting coating composition for automobiles.

The water-based rust inhibiting coating composition for surface preparation for painting may be a water-based coating composition which is provided by the addition of at least one member of the group consisting of rust preventive pigments and finely divided silica, as added in an appropriate amount, to a water-based coating composition containing the polyurethane resin emulsion and aqueous phenol resin (hereinafter referred to as "composition A"), a water-based coating composition containing the polyurethane resin emulsion and aqueous phenol resin and further the third component of the present invention (hereinafter referred to as "composition B") or a water-based coating composition comprising composition A or B and acidic catalyst added as necessary (hereinafter referred to as "composition C"). Said water-based coating composition is referred to as "composition D" hereinafter. Said rust preventive pigments preferably have an electric conductivity of not higher than 600 µS/cm as measured for an aqueous dispersion prepared by dispersing 1 g thereof in 100 g of deionized water. Composition D can be used as a water-based rust inhibiting coating composition.

Composition D is preferably prepared by adding 1 to 40 parts by weight, on the solid content basis, of at least one of the rust preventive pigments and silica mentioned above to 100 parts by weight, on the solid content basis, of composition A, B or C. At addition levels below 1 part by weight, the corrosion resistance will be low. At levels above 40 parts by weight, the corrosion resistance effect is saturated and at the same time the strength and water permeability of the coating films will decrease. A more preferred addition level is 1 to 20 parts by weight.

The rust preventive pigments mentioned above may be those to be used in the first aspect of the present invention.

The silica to be used in the third aspect of the present invention may be the same one as usable in the first aspect of the present invention, although dry-process silica or colloidal silica or the like, an aqueous dispersion of which shows a pH of 6 to 9, are preferred.

For using the water-based coating composition according to the third aspect of the present invention as a water-based lubricating and rust inhibiting coating composition, 3 to 15 parts by weight, on the solid content basis, of a wax is preferably added to 100 parts by weight of composition D (hereinafter the resulting composition is referred to as "composition E"). When the wax content is smaller than 3 parts by weight, the lubricating property during processing will be low. When said content exceeds 15 parts by weight, the adhesion to the top coat will be low.

Said wax is not limited to any particular species provided that it is dispersible in water. Thus, those species that are to be used in the first aspect of the present invention can be used.

For using the water-based coating composition according to the third aspect of the present invention as a water-based lubricating and rust inhibiting coating composition for automobiles, 0.05 to 25 parts by weight of a melamine cyanurate compound is preferably added to 100 part by weight of composition E.

When the level of addition of the melamine cyanurate compound is lower than 0.05 part by weight, the effect of preventing the adhering property of the substrate metal interface from being damaged by the voltage applied in the step of electrodeposition coating as mentioned later herein. When said level is above 25 parts by weight, the uniformity and compactness of the coating films obtained are lost and, in the case of thin film coating, the barrier effect is unfavorably impaired.

Said melamine cyanurate compound is a compound having an isocyanurate ring-containing planar structure and may be any of those that can be used in the first aspect of the present invention.

The water-based coating composition according to the third aspect of the present invention may further contain, as a further component or components, one or more of those pigments, solvents and various other additives that can be used in the practice of the present invention in accordance with the first aspect thereof at the same addition levels as in the first aspect of the present invention unless said further components and addition levels are incompatible with the constitution of the third aspect of the present invention.

The water-based coating composition according to the third aspect of the present invention can be prepared in the conventional manner using any of the methods usable in the practice of the first aspect of the present invention.

In cases where the water-based coating composition according to the third aspect of the present invention is used as a coating for surface preparation for painting of steel plates or galvanized steel plates or as a coating for lubrication and rust inhibition of unchromated or chromated galvanized steel plates, said composition after application to substrates is preferably dried forcedly or baked at 60° to 180° C. for 7 to 60 seconds. When the drying temperature is below 60° C., the coating films will not be cured sufficiently, hence the corrosion resistance will be unsatisfactory. At a baking temperature above 180° C., excessive curing is effected and the coating films tend to crack or peel off and, further, the top coat adhesion becomes de creased. When the baking time is shorter than 7 seconds, the curing will be insufficient and the coating films will have poor corrosion resistance. When said time is longer than 60 seconds, an excessively cured state is reached and such long baking time is disadvantageous from the production process viewpoint. More preferred conditions are 80° to 150° C. and 7 to 22 seconds and, still more preferred conditions are 110° to 130° C. and 8 to 15 seconds.

When film formation is effected by the so-called forced drying, such as drying at a temperature of 60° to 110° C. over a period not longer than 1 minute (e.g. 7 to 22 seconds), an acidic catalyst is preferably added.

When the drying temperature is below 60° C., a short drying time is not enough for water to evaporate with the result that stickiness persists.

When the drying temperature is employed as a condition of baking, the baking is preferably carried out at 120° to 180° C. At a baking temperature below 120° C., the melamine resin is hardened only insufficiently and the corrosion resistance becomes poor. A temperature above 180° C. results in overbaking and thus tends to decrease the processability and/or the top coat adhesion. A more preferred condition is 140° to 150° C.

In cases where baking is carried out at a drying temperature of 120° to 180° C., sufficient hardening can be attained without using any acidic catalyst. Even under such conditions, however, the acidic catalyst can be used to give coating films that are still more tough and excellent in adhering ability.

The coating films forcedly dried in the above manner are preferably allowed to stand for 48 hours after drying. During the standing period, the acidic catalyst further promote the condensation of the phenol resin to thereby improve the degree of curing and, in particular, the resistance against the MEK rubbing and coin scratching. Furthermore, the lubricating property as well as the resistance against discoloration upon immersion in an alkaline degreasing agent, film deterioration and the top coat adhesion can be improved with the result that the performance characteristics of the coating films become comparable to those attained by baking at 150° C. The above-mentioned allowing to stand can be performed making use of the period of waiting for the next step after application.

As regards the method of application of the water-based rust inhibiting coating composition according to the third aspect of the present invention to steel plates for surface preparation thereof, it is possible to apply composition A, B, C or D after dilution with water to a nonvolatile content of 10 to 20% to the degreased steel surface. The above composition preferably has a pH of 7.0 to 9.0. The method of application includes such conventional ones as dipping, spraying, showering and roller coating. The dry film thickness is preferably 0.5 to 10 μm. When said thickness is less than 0.5 μm, the uniformity is impaired and pinholes are tend to appear and allow corrosion to progress therefrom. A thickness greater than 10 μm leads to distortion and will not contribute to the wet adhesion any longer. A more preferred thickness is 2 to 5 μm.

Rust preventive agents such as inhibitors (e.g. Ciba-Gaigy's Irgacore) and chelating agents such as phytic acid and gallic acid may be incorporated in the composition mentioned above.

In cases where the water-based rust inhibiting coating composition according to the third aspect of the present invention is used for surface preparation for painting of the galvanized surface, composition D derived from composition A, B or C by addition of silica is used. When the galvanized surface is coated, surface preparation for painting is generally followed by application of a primer containing a rust preventive pigment and therefore no rust preventive pigment is required for said surface preparation. However, when a particular rust preventive effect is desired, one or more rust preventive pigments may be incorporated.

In using the water-based coating composition according to the third aspect of the present invention in fields where bending processing of colored galvanized iron sheets, metal sheets for household electric appliances or the like is of importance, the wax-containing water-based lubricating and rust inhibiting coating composition E may be used for the purpose of improving the adhesion and preventing the peeling off on the occasion of bending processing. As for the method of application, said water-based lubricating and rust inhibiting coating composition can be applied, after dilution to an appropriate concentration, to the galvanized surface so as to attain a dry film thickness of 0.5 to 3 μm using a roll coater, for instance. When the film thickness is smaller than 0.5 μm, pinholes are formed with the result that the corrosion resistance and wet adhesion are decreased. When said thickness is larger than 3 μm, the coating films may unfavorably peel off during bending processing. A more preferred film thickness is 1 to 3 μm. Generally, after this coating step, bending or deep drawing is performed and, if necessary after alkaline degreasing, various coating steps are conducted.

The water-based lubricating and rust inhibiting coating composition according to the third aspect of the present invention can be applied to galvanized steel sheets for automobiles and then dried to give a dry film thickness of 0.5 to 3 μm. The method of application is not critical. Thus, conventional application methods can be employed, for example air spray coating, airless spray coating and electrostatic coating. Then, after processing such as bending, pressing or drawing, cationic or anionic electrodeposition coating is conducted to attain a dry film thickness of 15 to 40 μm, then, if necessary, an intermediate coat of the alkyd resin, polyester resin or acrylic resin type is applied to give a dry film thickness of 20 to 60 μm and, thereafter, an acrylic resin, polyester resin or fluororesin type top coat for automobiles can be applied.

In applying the water-based coating composition according to the third aspect of the present invention as a water-based lubricating and rust inhibiting coating composition or water-based lubricating and rust inhibiting coating composition for automobiles, two characteristics, namely the hardened film Tg and elongation percentage are important to the hardened coating films formed.

The hardened films preferably have a Tg of not lower than 40° C. When the hardened film Tg is below 40° C., the coefficient of dynamic friction (μd), which is indicative of the lubricating characteristics, becomes not smaller than 0.1 with the result that such processing as bending or press drawing can no longer be performed smoothly. More preferably, said films have a Tg of not lower than 44° C., still more preferably not lower than 50° C. When the Tg exceeds 50° C., the μd is saturated and will not lower to a substantial extent. However, in this region, the coin scratch resistance, which is indicative of the adhesion of the coating films, is further improved. In this region, such sophisticated processing as cylindrical raise-drawing can be performed without such damages as bites.

The coefficient of dynamic friction can be measured using a Baudenleben dynamic friction coefficient measuring apparatus.

Ethylene-acrylic emulsions, for instance, which are different from polyurethane emulsions, give a Tg of not higher than 40 ° C., hence the μd is great and the lubricating property is poor.

In some instances, the lubricating property during processing cannot be explained in terms of the Tg of the hardened films alone. For instance, certain acrylic emulsions have a high Tg but show little elongation in film form, causing powdering during processing. Thus, the elongation percentage of the hardened films is another important characteristic.

The hardened films preferably have an elongation percentage of 1.5 to 6%. As said percentage is smaller than 1.5%, the elongation is small, so that powdering occurs in the cylindrical deep drawing test. When said percentage is greater than 6%, the powdering resistance improving effect comes up to saturation while the substrate adhesion decreases and the coating films tend to peel off with the result that the processability decreases. More preferably, the elongation percentage is 2 to 6%, still more preferably 3 to 6%.

The requirements to be met by the hardened films for enabling such high-level processing as deep drawing are that the film Tg is not lower than 40° C., preferably not lower than 50° C. and that the film elongation percentage is not less than 1.5%. Coating films satisfying the above requirements can be realized by applying the water-based lubricating and rust inhibiting coating composition to a dry film thickness of 0.5 to 3 μm, followed by forced drying at 60 to 110° C. for 7 to 22 seconds in the presence of an acidic catalyst or baking at 120° to 180° C. for 7 to 22 seconds in the absence of any acidic catalyst or baking at 120° to 180° C. for 7 to 22 seconds in the presence of an acidic catalyst.

The metal substrates (e.g. galvanized steel plates and the like) coated with the water-based coating composition according to the third aspect of the present invention may further be coated, as necessary. This further coating can be performed by the same method as mentioned in relation to the first aspect of the present invention while adjusting the undercoat film thickness generally to a 3 to 10 μm in the dried state and the top coat film thickness generally to 10 to 50 μmin the dried state.

Prior to coating, the substrate metal plates may be subjected to pretreatment beforehand for rendering the material rustproof and improving the paint adhesion. As said pretreatment, there may be mentioned, for example, degreasing treatment such as acid and alkali washing.

The coating system to be combined with the coating films formed by the water-based coating composition according to the third aspect of the present invention is not limited to those mentioned above. As regards the resin type, the organic solvent type, water-based type and powder type can each be employed.

The water-based coating composition according to the third aspect of the present invention is suited for coating automobile; household electric appliances such as refrigerators and washing machines; and building materials such as front doors, among others.

The water-based lubricating and rust inhibiting coating composition according to the third aspect of the present invention can further be used to cope with various forms of corrosion in various metal materials. In the case of steel plates, for instance, sheet-form steel plates are degreased, then coated with the water-based lubricating and rust inhibiting coating composition according to the third aspect of the present invention and, after lubricated processing to a desired shape, finished by necessary coating, whereupon said composition can suitably contribute to improvement in humidity resistance and water resistance (against blistering and wet adhesion impairment), prevention of coat film peeling from cuts in the salt spray test, prevention of rusting from advancing and the like.

In another area of application, said composition can be used in a substitute rust inhibiting method for chemical conversion treatment in the precoated metal production process in which sheet-form degreased steel plates are treated by zinc phosphating chemical conversion treatment or with a dry-inplace chromating agent and then finished by coating with a primer or top coat. Thus, the water-based lubricating and rust inhibiting coating composition according to the third aspect of the present invention can be applied for the purpose of providing lubricating property and rendering the surface prepared for painting resistant to corrosion and, further, avoiding various disadvantages of chemical conversion treatment, for example zinc phosphate sludge, space for chemical conversion and chromate toxicity.

In another field of application of metal materials, namely in the case of postcoating where sheet-form steel plates are processed under lubrication in the presence of a lubricant or the like, then degreased, phosphated and finished by painting, said composition can be used in a substitute rust preventing treatment for phosphate treatment. In this case, the byproduct sludge resulting from phosphate treatment is no more encountered and the space for chemical conversion treatment can advantageously be reduced. These metal materials are used in the manufacture of steel furniture and other metal products in the field of general industry.

The substrate steel materials to which the water-based lubricating and rust inhibiting coating composition according to the third aspect of the present invention is to be applied may have been subjected to conventional rust preventive treatment. For example, the materials of the so-called hoops, which are steel strips used for bundling products by steel manufactures and others or strips for packaging, have a coating film of iron oxide or the like as formed thereon in many instances. To this is applied the water-based lubricating and rust inhibiting coating composition according to the aspect of the present invention, which is then dried to give finished hoop products. In this case, the slip characteristics on the occasion of product winding up are improved, the products are protected from damaging due to friction in the process of winding, the productivity of winding is improved, and the corrosion resistance of the products themselves is further improved. In this case, no top coat is generally applied and the function for surface preparation for painting need not be provided.

The water-based lubricating and rust inhibiting coating composition according to the third aspect of the present invention can also be applied to plated products other than steel plates, to otherwise surface-treated and to stainless steel. As such, there may be mentioned, for example, galvanized steel plates, electrogalvanized steel plates, zinc-based alloy-coated steel plates (e.g. zinc-aluminum, zinc-nickel, zinc-tin, zinc-lead, zinc-iron, zinc-cobalt and like alloys), lead-based alloy-coated steel plates (e.g. lead-coated steel plates called turne sheets), aluminized steel plates or aluminum alloy-coated steel plates, tin-plated steel plates, copper-plated steel plates, nickel-plated steel plates and the like. Said composition is effective in providing these metal-coated steel plates with lubricating ability during processing and corrosion resistance after processing and in preparing their surface for painting. Said composition can further be applied in gaseous phase metal coating, to tin-free steel and to otherwise surface-treated steel plates (e.g. reaction type chromating, dry-inplace chromating, chemical conversion treatment and the like), although these do not involve any plating technique.

Galvanized or electrogalvanized or zinc-plated or zinc alloy-coated and aluminum alloy-coated metals are widely used generally as precoated metals in the so-called PCM field of colored steel plates to manufacture roofing materials, exterior materials, housings of household electric appliances and the like and in other general industrial fields to manufacture various metal products. In such a field, various types of corrosion will occur caused by respective use environments. In the case of roofing materials and exterior materials, for instance, coating film peeling or white rusting from damaged portions, or coating film peeling on edges is generally observed. The water-based lubricating and rust inhibiting coating composition according to the third aspect of the present invention can be used in lieu of conventional chemical conversion treatment. Thus, the water-based lubricating and rust inhibiting coating composition according to the third aspect of the present invention can be applied for the purpose of providing lubricating property, giving corrosion resistance to substrates prepared for painting and avoiding various disadvantages of chemical conversion treatment, for example, zinc phosphate sludge, space of the installation for the process of chemical conversion treatment and toxicity of chromate. The water-based lubricating and rust inhibiting coating composition according to the third aspect of the present invention is applied to sheet-form plated products, generally followed by finishing by undercoating and top coating. In this case, said composition performs the surface preparation function rather than the lubrication function in processing and is effective in preventing coating film peeling.

In the field of household electric appliances such as rice cookers, stove housings, fuel tanks for stoves, rice chests, containers and the like, said composition is useful in providing processed vessels or receptacles with a lubricating and rust inhibiting coating in addition to the functions mentioned above. Namely, in these fields, high-level processing such as high-speed deep drawing is carried out and therefore said composition can perform its lubricating function in said processing step and further can be suitably used to eliminate the prior art step of degreasing following processing under lubrication in which step a hazardous solvent has been used.

In automobile bodies and automobile parts, zinc-nickel alloy plated steel is mainly used. In particular uses, lead-based alloy coated steel, aluminized steel, aluminum alloy coated steel, tin plated steel and the like are frequently used. Thus, lead-based metal coated steel is applied as turne sheets to fuel tanks and the like by making use of its chemical inertness. In this field, the water-based lubricating and rust inhibiting coating composition according to the third aspect of the present invention can be used for the purpose of obtaining coating films having lubricating property and corrosion resistance suited for treating fuel tanks. Aluminized steel is used in heat resistant parts for reasons of good heat resistance. In this case, complicatedly shaped articles account for a large proportion and this means high-level processing and, therefore, the water-based lubricating and rust inhibiting coating composition according to the third aspect of the present invention is suitable. Further, tin plating and tin-free steel, for instance, are used in the manufacture of cans and the like. In this case, too, forming processing and corrosion resistance after processing are required, hence the use of the water-based lubricating and rust inhibiting coating composition according to the third aspect of the present invention is appropriate.

The water-based lubricating and rust inhibiting coating composition according to the third aspect of the present invention is characterized by its lubricating and firmly adhering properties and corrosion resistance resulting from these and therefore can suitably be used for processing and corrosion prevention of various metals such as mentioned above.

By selecting the self-emulsifying polyurethane resin emulsion, aqueous phenol resin and acidic catalyst as essential components in the water-based rust inhibiting coating composition according to the third aspect of the present invention, the hardened film Tg can be raised and, as a result, tough and firmly adhering rust inhibiting coating films can be obtained and high-level lubricating ability during processing and high-level corrosion resistance can be realized.

When compared with the water-based coating composition concretely disclosed in Japanese Patent Application No. Hei-6-210460 and composed of (a) 100 parts by weight of a phosphoric acid-modified bisphenol type epoxy resin having an phosphate group-due acid value of 5 to 35 and (b) 10 to 500 parts by weight of at least one member of the group consisting of oxazoline compounds, phenol resins, and melamine resins showing a hardening initiation temperature of not higher than 140° C. as supplemented with (c) 0.1 to 5% by weight, based on the sum of (a) and (b), of at least one acidic catalyst selected from the group consisting of benzene sulfonic acid derivatives, amine salts and ammonium salts thereof, naphthalenesulfonic acid derivatives, amine salts and ammonium salts thereof, acidic amine salts and ammonium salts of phosphoric acid, and phosphonic acid derivatives, amine salts and ammonium salts thereof, the coating composition according to the third aspect of the present invention can be made up into films under the conditions of the so-called forced drying (low temperature, short time), namely at a lower temperature of 60° to 110° C. and in a shorter period of 7 to 22 seconds, with a sufficient level of film strength and adhesion, so that the increasing line speed in the production line can be fully coped with and, at the same time, sufficient processability can be secured.

In particular, the addition of a specific amount of the aqueous phenol resin improves the adhesion to metal surfaces owing to the phenolic hydroxyl groups, giving coating films excellent in corrosion resistance without using any bisphenol type epoxy resin and, further, enabling film formation by forced drying (low temperature, short time) at 60 to 110 for 7 to 22 seconds due to the condensation reaction of the phenol resin, whereby corrosion resistance and lubricating property for processing are secured. Furthermore, when a baking temperature of 120° to 180° C. is selected, no acidic catalyst is required thanks to the self-condensation reaction of the phenol resin and, therefore, the decrease in water resistance due to the catalyst residue is suppressed.

Furthermore, tough coating films can be obtained by combinedly using a high Tg polyurethane resin emulsion and a high-molecular-weight polyurethane resin. These coating films have a film Tg of not lower than 40° C. and an elongation percentage of not less than 3%. If these conditions are satisfied, a high level of lubricating property for processing can be obtained. In addition, the adhesion of the top coat is improved even at overbaking and, therefore, the temperature range for coating baking is broadened.

When used as a water-based rust inhibiting coating composition for surface preparation for painting, a water-based lubricating and rust inhibiting coating composition or a water-based lubricating and rust inhibiting coating composition for automobiles, the water-based coating composition according to the third aspect of the present invention, which has the composition mentioned above, can give tough and firmly adhering rust inhibiting coating films with high-level lubricating property for processing and corrosion resistance even under low-temperature short-time forced drying conditions and thus can provide water-based coating compositions with which the increasing coating line speed can be coped with. Furthermore, under high temperature baking conditions, said composition, which requires no acidic catalyst under such conditions, can give highly processible coated steel plates with the water resistance prevented from lowering.

EXAMPLES

The following resin production examples and working examples are further illustrative of the present invention but are by no means limitative of the scope of the present invention.

Resin Production Example 1-1

A vessel equipped with a stirrer, a temperature controller and a decanter was charged with the following raw materials and the charge was heated with stirring.

| | |
|---|---|
| Soybean fatty acid | 30 weight parts |
| Trimethylolpropane | 17 weight parts |
| Neopentyl glycol | 13 weight parts |
| Trimellitic anhydride | 7 weight parts |
| Isophthalic acid | 32 weight parts |
| Xylene | 1 weight part |
| Dibutyltin oxide | 0.02 weight part |

The water formed with the progress of the reaction was removed azeotropically with the xylene and the heating was continued until an acid value of 30 and a hydroxyl value of 60 were obtained. The reaction was then discontinued. The resin obtained was diluted with butyl cellosolve to a nonvolatile content of 70% by weight to give an alkyd resin varnish. This resin varnish had a Gardner viscosity of $Z_2$ and an SP value of 10.37. This resin varnish was neutralized with triethylamine to an extent of theoretical 100% and adjusted to a non-volatile content of 40% by weight with deionized water to give a water-soluble alkyd resin varnish (varnish A).

Resin Production Example 1-2

The same reaction vessel as used in Resin Production Example 1-1 was charged with the following raw materials and the charge was heated with stirring.

| | |
|---|---|
| Soybean fatty acid | 34 weight parts |
| Trimethylolpropane | 31 weight parts |
| Neopentyl glycol | 13 weight parts |
| Trimellitic anhydride | 9 weight parts |
| Isophthalic acid | 25 weight parts |
| Xylene | 1 weight part |
| Dibutyltin oxide | 0.02 weight part |

The water formed with the progress of the reaction was removed azeotropically with the xylene and the heating was continued until an acid value of 50 and a hydroxyl value of 125 were obtained. The reaction was then discontinued. The reaction mixture was treated in the same manner as in Resin Production Example 1-1 to give a water-soluble alkyd resin varnish (varnish B).

Resin Production Example 1-3

Water-soluble alkyd resin varnishes (varnishes C to H) having the respective acid values and hydroxyl values shown in Table 1 were prepared in the conventional manner using the same raw materials as used for the water-soluble alkyd resin varnishes A and B but adjusting the mole ratio between the acid and alcohol components as well as the reaction time.

Resin Production Example 1-4

The same reaction vessel as used in Resin Production Example 1-1 was charged with the following raw materials and the charge was heated with stirring.

| | |
|---|---|
| Soybean fatty acid | 1.8 weight parts |
| Trimethylolpropane | 15 weight parts |
| Neopentyl glycol | 13 weight parts |
| 1,6-Hexanediol | 30 weight parts |
| Trimellitic anhydride | 11 weight parts |
| Isophthalic acid | 42 weight parts |
| Xylene | 1 weight part |
| Dibutyltin oxide | 0.02 weight part |

The water formed with the progress of the reaction was removed azeotropically with the xylene and the heating was continued until an acid value of 50 and a hydroxyl value of 125 were obtained. The reaction was then discontinued. The reaction mixture was treated in the same manner as in Resin Production Example 1-1 to give a water-soluble alkyd resin varnish (varnish I).

[Measurements of physical characteristics of water-soluble alkyd resin varnishes]

The above-mentioned water-soluble alkyd resin varnishes A to I were tested for acid value, hydroxyl value, SP value, low-molecular-weight acid components content and effective acid value. The data obtained are shown in Table 1.

The SP value was measured as follows. 0.5 g of each water-soluble alkyd resin varnish was weighed in a 100-ml beaker, 10 ml of a hydrophilic solvent such as dioxane or acetone was added and the mixture was stirred for effecting dissolution. Using a 50-ml buret, a hydrophobic solvent such as n-hexane or deionized water was added dropwise until the point of clouding. The measurement was performed at 20° C. Using the amount of drops required for clouding and other values, the SP value was calculated as described in the literature (J. Polymer Science, A-1, vol. 5, pp. 1671–1681).

The low-molecular-weight acid components content was determined as follows. The water-soluble alkyd resin varnish to be tested was adjusted to 3% non-volatile matter by adding a diluent composed of water and butyl cellosolve (98:2) and subjected to ultra filtration (UF). The ultrafiltration membrane "EW4026" (Desalination Systems) was used and the operation was continued at 25°–30° C. until the non-volatile matter amounted to 25%. The amount of the filtrate obtained during the operation period and the non-volatile content of the filtrate were determined. IR spectrometry and liquid chromatography proved that the components in said filtrate were low-molecular-weight acid components resulting from hydrolysis of the water-soluble alkyd resin varnish during storage and residual monomers. The low-molecular-weight acid components content was defined as the ratio of the parts by weight of the non-volatile matter in the filtrate to 100 parts by weight of the original resin.

The effective acid value was determined as follows. The water-soluble alkyd resin varnish filtered in the UF process of the low-molecular-weight acid components content determination mentioned above was tested for acid value. The effective acid value was defined as the acid value thus determined. This corresponds to the acid value owing to the carboxyl group bound to the alkyd resin polymer.

TABLE 1

| Water-soluble alkyd resin varnish | Acid value | Hydroxyl value | SP value | Low-molecular-weight acid components content (%) | Effective acid value |
|---|---|---|---|---|---|
| A | 30 | 60 | 10.37 | 2.5 | — |

TABLE 1-continued

| Water-soluble alkyd resin vanish | Acid value | Hydroxyl value | SP value | Low-molecular-weight acid components content (%) | Effective acid value |
|---|---|---|---|---|---|
| B | 50 | 125 | 10.37 | 4 | 43 |
| C | 39 | 140 | 10.4 | 2.5 | 33 |
| D | 30 | 150 | 10.5 | 2 | 29 |
| E | 33 | 120 | 10.3 | 2 | 33 |
| F | 36 | 140 | 10.4 | 2 | 32 |
| G | 55 | 150 | 10.6 | 10 | 29 |
| H | 44 | 150 | 10.5 | 5.5 | 31 |
| I | 50 | 125 | 10.5 | — | — |

Examples 1-1 to 1-6 and Comparative Examples 1-1 and 1-2

Water-based coating compositions were prepared by admixing titanium oxide, silica, a rust preventive pigment and a hardener with the water-soluble alkyd resin varnish C in the respective proportions shown in Table 2. In Table 2, the values are given in parts by weight.

Tipaque R930 (Ishihara Sangyo) was used as the titanium oxide mentioned above. Nipsil 170 (Nippon Silica Industrial) was used as the silica mentioned above.

As regards the rust preventive pigment, A in Table 2 stands for LF Bosei CP-Z (Kikuchi Color & Chemicals; calcium phosphate-based; electric conductivity 270 μS/cm), B for LF Bosei PM300C (Kikuchi Color & Chemicals; aluminum phosphomolybdate-based; electric conductivity 17 μS/cm), and C for K White 84S (Tayca; Corp. aluminum tripolyphosphate-based; electric conductivity 14 μS/cm.

The following were used as the hardner: Mitsui-Cytec's melamine resins Cymel 236, Cymel 238, Cymel 303, Cymel 328 and Cymel 232, and Nippon Shokubai's oxazoline compounds Epocross K1030E and Epocross K1050E.

Catalyst 500 (Mitusi-Cytec) and ammonium monohydrogen phosphate were used each as a catalyst.

[Methods of evaluation]

The coating compositions of Examples 1-1 to 1-6 and Comparative Examples 1-1 and 1-2 as obtained in the above manner were each diluted with water to an extent such that the NK #2 cup viscosity became 50 seconds. The dilutions were each sprayed on zinc phosphated panels (Nippon Test Panel; 0.8 mm in thickness) in an amount to give a dry coating thickness of 25 to 30 μm and the thus-coated panels were preheated at 60° C. for 3 minutes. The panels were then further sprayed with the water-based paint Odeselect 500 (Nippon Paint) in an amount to give a dry coating thickness of 20 μm and baked at 160° C. for 20 minutes.

1. Boiling water resistance and humidity resistance

The paint films thus obtained were tested for boiling water resistance (0.5 hour) and humidity resistance (50° C., 95% RH, 100 hours). For evaluating the boiling water resistance and humidity resistance, the criteria mentioned below were employed. The results obtained are shown in Table 2.

⊙: Little blistering.

o: Few blisters according to the ASTM rating (F).

Δ: Medium blistering according to the ASTM rating (M).

x : Dense blistering according to the ASTM rating (D or MD).

2. Paint film peeling

The above paint films were further subjected to salt spray testing (600 hours) and then evaluated for resistance to peeling in the cross-cut test. For this evaluation, the criteria shown below were employed. The results are shown in Table 2.

⊙: No peeling.

o: Not more than 1 mm in one-side peeling width.

Δ: Not more than 2 mm in one-side peeling width.

x : More than 2 mm in one-side peeling width.

TABLE 2

| | Examples | | | | | | Comparative Examples | |
|---|---|---|---|---|---|---|---|---|
| | 1-1 | 1-2 | 1-3 | 1-4 | 1-5 | 1-6 | 1-1 | 1-2 |
| Water-based coating compositions Components: Parts by weight (solid content basis) | (1) | (2) | (3) | (4) | (5) | (6) | (7) | (8) |
| Water-soluble alkyd resin vanish C (nonvolatile content 75%) | 100 | 100 | 100 | 100 | 100 | 100 | 100 | 100 |
| Titanium oxide | 100 | 100 | 100 | 100 | 100 | 100 | 100 | 100 |
| Silica | 2 | — | 2 | — | 2 | — | 2 | 2 |
| Rust preventive pigment A | 10 | — | — | — | — | — | — | — |
| Rust preventive pigment B | — | 10 | — | 10 | — | 10 | — | 10 |
| Rust preventive pigment C | — | — | 10 | — | 5 | — | 10 | — |
| Cymel 236 | 20 | — | — | — | — | — | — | — |
| Cymel 238 | — | 15 | — | — | — | — | — | — |
| Cymel 303 | — | — | 25 | — | — | — | — | — |
| Cymel 328 water-soluble | — | — | — | 20 | — | — | — | — |
| Epocross K1030E | — | — | 10 | 10 | 25 | — | — | — |
| Epocross K1050E | — | — | — | — | — | 10 | 10 | — |
| Cymel 232 | — | — | — | — | — | — | — | 20 |
| Catalyst 500 | 2 | 1 | 2 | — | 2 | — | — | 2 |
| Ammonium hydrogen phosphate | — | — | — | 1 | — | 1 | — | — |
| Boiling water resistance | o | ⊙ | ⊙ | ⊙ | o | ⊙ | Δ | Δ |

TABLE 2-continued

|  | Examples | | | | | | Comparative Examples | |
| --- | --- | --- | --- | --- | --- | --- | --- | --- |
|  | 1-1 | 1-2 | 1-3 | 1-4 | 1-5 | 1-6 | 1-1 | 1-2 |
| Humidity resistance | ◯ | ◯ | ⊙ | ⊙ | ◯ | ◯ | X | X |
| Paint film peeling | ◯ | ◯ | ⊙ | ⊙ | ⊙ | ⊙ | △ | △ |

Examples 1-7 and 1-8 and Comparative Examples 1-3 and 1-4

Water-based coating compositions [compositions (9) to (12)] were prepared by adding, to the water-soluble alkyd resin varnishes B and I, the hydrophobic methoxybutoxy-modified melamine resin Cymel 236 (Mitusi-Cytec) or methoxybutoxy-modified melamine resin Cymel 235 (Mitsui-Cytec) as a hardener, and the dinonylnaphthalenesulfonic acid-based catalyst Catalyst 500 (Mitsui-Cytec) in the respective proportions shown in Table 3.

In Table 3, the proportions of the respective components are given in terms of parts by weight. The water-soluble alkyd resin varnishes B and I had a solid content of 75%.

The water-based clear coating compositions (9) to (12) were adjusted to 20% solid content by diluting with water, then allowed to stand at 25° C. for 2 weeks and examined for the state of emulsion and the size of emulsified resin particles. The results obtained are shown in Table 3.

Furthermore, the above-mentioned water-based coating compositions (10) and (12) were adjusted to 3% solid content by diluting with water and then concentrated to 20% solid content by ultrafiltration, and the water-based coating compositions after ultrafiltration were examined for hydration stability. The results obtained are shown in Table 3.

TABLE 3

|  | Examples | | Comparative Examples | |
| --- | --- | --- | --- | --- |
|  | 1-7 | 1-8 | 1-3 | 1-4 |
| Water-based coating compositions Components:Parts by weight (solid content basis) | (9) | (10) | (11) | (12) |
| Water-soluble alkyd resin vanish B(nonvolatile content 75%) | 100 | 100 | — | — |
| Water-soluble alkyd resin vanish I(nonvolatile content 75%) | — | — | 100 | 100 |
| Cymel 236 | 25 | — | 25 | — |
| Cymel 235 | — | 25 | — | 25 |
| Catalyst 500 | 2 | 2 | 2 | 2 |
| Hydration stability | clear | clear | resin separation and precipitation | opaque |
| Hydration stability after ultrafiltration |  | no abnormality |  | opaque |

The data shown in Table 3 revealed that the water-based clear coating (10) having an oil length of 38 was in a stably emulsified state but that the water-based clear coating (12) having an oil length of 2 was poor in emulsion stability.

Examples 1-9 to 1-13

Water-based coating compositions [compositions (13) to (17)] were prepared by adding, to the alkyd resin varnishes A, B, C, E and H, titanium oxide or calcium carbonate as a pigment, the methoxybutoxy-modified melamine resin Cymel 236 (Mitsui-Cytec) as a hardener, and the dinonylnaphthalenesulfonic acid-based catalyst Catalyst 500 (Mitsui-Cytec) in the respective proportions given in Table 4.

Zinc phosphated steel plates were coated with the above water-based coating compositions (13) to (17) respectively to a thickness of 20 to 25 µm, followed by baking. The coatings were tested for humidity resistance in an environment maintained at 95% relative humidity and 50° C. for 100 hours. Evaluation was performed according to ASTM D 714-56 and the results were expressed on a numerical scale from 10 (no blistering) to 0. The evaluation results are shown in Table 4.

TABLE 4

|  | Examples | | | | |
| --- | --- | --- | --- | --- | --- |
|  | 1-9 | 1-10 | 1-11 | 1-12 | 1-13 |
| Water-based coating compositions Components:Parts by weight (solid content basis) | (13) | (14) | (15) | (16) | (17) |
| Water-soluble alkyd resin vanish A | 100 | — | — | — | — |
| Water-soluble alkyd resin vanish B | — | 100 | — | — | — |
| Water-soluble alkyd resin vanish C | — | — | 100 | — | — |
| Water-soluble alkyd resin vanish E | — | — | — | 100 | — |
| Water-soluble alkyd resin vanish H | — | — | — | — | 100 |
| Titanium oxide | 100 | 100 | 100 | 100 | 100 |
| Calcium carbonate | 5 | 5 | 5 | 5 | 5 |
| Hardener | 25 | 25 | 25 | 25 | 25 |
| Catalyst | 2 | 2 | 2 | 2 | 2 |
| Humidity resistance | 9 | 8 | 9 | 9.5 | 5 |
| Low-molecular-weight acid components content (%) | 2.5 | 4 | 2.5 | 2 | 5.5 |

As is seen from Table 4, when the low-molecular-weight acid components content was not higher than 4%, the score was or higher and the performance was almost satisfactory.

Example 1-14

A 20% (solid content basis) aqueous dispersion of each of the unneutralized alkyd resin varnishes B, C, E, F, G and H was prepared, dimethylethanolamine was added dropwise thereto, and the pH at which the dispersion was emulsified to give a clear solution was read. The results, arranged against the effective acid value, are shown in FIG. 1.

The pH at which clear emulsification is attained is a measure of the degree of solubilization in water of the alkyd resin varnish. In the pH region below said pH, dilution and/or storage of the paint or alkyd resin varnish will result in precipitation. The above-mentioned phenomenon is of great significance in connection with the stability in water of a paint of the type to be concentrated and recovered by ultrafiltration of its dilutions. Particularly in recovery by ultrafiltration, the amine added in excess for stabilization flows out into the filtrate, whereby the percentage of neutralization of the system becomes approximately 100% (pH 7.5). Therefore, when the pH required for clarification is not lower than 7.5, the stability of the paint becomes poor upon concentration by ultrafiltration. It was revealed that when the effective acid value is not less than 31, the stability in water persists even after ultrafiltration.

Example 1-15

[Production of lubricating and rust inhibiting coating composition]

A water-based lubricating and rust inhibiting coating composition (composition 1) was produced by adding, to 100 parts by weight (solid basis) of the water-soluble alkyd resin varnish C obtained in Resin Production Example 1-2, 20 parts by weight of the oxazoline compound Epocross K-1050E (Nippon Shokubai) and 30 parts by weight of the melamine resin Cymel 328 (Mitsui-Cytec), both as hardeners, 2 parts by weight of ammonium dihydrogen phosphate as an acid catalyst, an amount, corresponding to 15 parts by weight (solid basis) per 100 parts by weight of the sum of the water-soluble alkyd resin varnish and hardener components, of Adelite AT20N (Asahi Denka Kogyo) as silica, and an amount, corresponding to 5 parts by weight (solid basis) per 100 parts by weight of the sum of the water-soluble alkyd resin varnish and hardener components, of the aqueous polyethylene wax emulsion Chemipearl W700 (Mitsui Petrochemical) as a wax. The levels of addition of the respective components are shown in Table 5.

The above lubricating and rust inhibiting coating composition (1) was diluted with water to a non-volatile content of 20% and applied to steel plates using a bar coater to give a dry film thickness of 2 μm. Drying was performed at 150° C. for 8 seconds. The plate temperature attained was 150° C.

The steel plates were electrogalvanized steel plates having a thickness of 0.35 mm. These were used after chromating with NRC300 (Nippon Paint). The chromate coating weighed 50 mg/m$^2$ as Cr metal.

[Methods of evaluation]

The steel plates coated with the above lubricating and rust inhibiting coating composition (1) were evaluated for solvent resistance, alkali resistance, cylindrical drawing test, powdering, flat portion corrosion resistance, and quick curing property.

1. Solvent resistance

The coating surface was rubbed with gauze impregnated with methyl ethyl ketone (hereinafter referred to as "MEK") pressed against said surface under a load of 300 g. After 10 repetitions of rubbing, said surface was examined for changes. The following criteria were used. The results are shown in Table 5.

⊚: No peeling at all.

o: Only partial peeling.

Δ: Peeling ranking between o and x.

x : Peeling over about ½ of the coated surface area.

x x : Peeling all over the coated surface.

2. Alkali resistance

After 10 minutes of immersion in the alkaline degreasing agent Surfcleaner 53S (Nippon Paint) at 45° C., the coating surface was examined for changes. The following evaluation criteria were used. The results are shown in Table 5.

⊚: No abnormality.

o:Only partial whitening.

Δ: Whitening in an area between o and x.

x : Whitening over about ½ of the coating surface area.

x x : Whitening all over the surface.

3. Cylindrical drawing test

After cylindrical drawing, the coating surface was examined for flaws. The following criteria were used. The results are shown in Table 5.

⊚: No abnormality.

o: Flaws observed only partially.

x : Several flaws.

x x : Cracks and/or bites.

4. Powdering

For evaluating the processed portion for powdering resulting from coating film peeling, the following criteria were used. The results are shown in Table 5.

⊚: No abnormality.

o: Only partial powdering.

x : Powdering ranking between o and x x.

x x: Powdering all over the processed portion.

5. Corrosion resistance

The salt spray test (SST) according to JIS z 2371 was conducted for 800 hours and the coated surface was examined for rusting. The following criteria were used. The results are shown in Table 5.

⊚: No abnormality.

o: White rust observed only partially.

Δ: White rust in an area between o and x.

x White rust over about ½ of the coated surface area.

x x White rust all over the surface.

6. Quick curing property

The baking time required for the coating to become free of peeling after 10 repetitions of rubbing in the MEK rubbing test mentioned above was determined. The results are shown in Table 5.

Examples 1-16 and 1-17 and Comparative Examples 1-5 and 1-6

Water-based lubricating and rust inhibiting coating compositions [(2) to (5)] were produced in the same manner as in Example 1-15 except that the proportions of the hardener and catalyst were varied as specified in Table 5. The compositions were applied to steel plates, and the coatings were evaluated. The evaluation results are shown in Table 5.

TABLE 5

|  | Examples | | | Comparative Examples | |
| --- | --- | --- | --- | --- | --- |
|  | 1-15 | 1-16 | 1-17 | 1-5 | 1-6 |
| Lubricating and rust inhibiting coating compositions Components:Parts by weight (solid content basis) | (1) | (2) | (3) | (4) | (5) |
| Water-soluble alkyd resin vanish C(nonvolatile content 75%) | 100 | 100 | 100 | 100 | 100 |
| Epocross K1050E | 20 | 20 | — | 20 | — |
| Cymel 328 | 30 | — | 20 | 20 | — |

TABLE 5-continued

|  | Examples | | | Comparative Examples | |
|---|---|---|---|---|---|
|  | 1-15 | 1-16 | 1-17 | 1-5 | 1-6 |
| Cymel 232 | — | — | — | — | 30 |
| Ammonium hydrogen phosphate | 2 | 2 | 2 | — | 2 |
| Silica | 15 | 15 | 15 | 15 | 15 |
| Wax | 5 | 5 | 5 | 15 | 15 |
| Film properties | | | | | |
| Solvent resistance | ⊚ | Δ | Δ | X | X |
| Alkali resistance | ⊚ | O | Δ | XX | XX |
| Productivities | | | | | |
| Cylindrical drawing test | ⊚ | O | X | XX | XX |
| Powdering | O | O | O | X | X |
| Corrosion resistance | | | | | |
| Flat portion corrosion resistance | ⊚ | O | Δ | X | X |
| Quick curing property (at 150° C.) (seconds) | 8 | 15 | 20 | 300 | 600 |

Resin Production Example 2-1

A vessel equipped with a stirrer, a temperature controller and a decanter was charged with the following raw materials and the charge was heated with stirring.

| Soybean fatty acid | 34 weight parts |
|---|---|
| Trimethylolpropane | 34 weight parts |
| Trimellitic anhydride | 9 weight parts |
| Isophthalic acid | 25 weight parts |
| xylene | 1 weight part |
| Dibutyltin oxide | 0.5 weight part |

The water formed with the progress of the reaction was removed azeotropically with the xylene and the heating was continued until an acid value of 39 and a hydroxyl value of 140 were attained. The reaction was then discontinued. The reaction mixture was diluted with butyl cellosolve to a non-volatile content of 70% by weight to give an alkyd resin varnish. This resin varnish had a Gardner viscosity of $Z_2$ and an SP value of 10.4. This resin varnish was theoretically 100% neutralized with triethylamine and adjusted to a non-volatile content of 40% by weight with deionized water to give a water-soluble alkyd resin varnish. This varnish had an effective acid value of 33.

The SP value and effective acid value were determined in the same manner as in Resin Production Example 1-1.

Example 2-1

The polyurethane resin emulsion. Hydran HW960 (Dainippon Ink and Chemicals) (10 parts by weight on the solid content basis) was admixed with 90 parts by weight (resin solid basis) of the water-soluble alkyd resin varnish obtained in Resin Production Example 2-1. Into this mixture were incorporated 20 parts by weight of the oxazoline compound Epocross K-1050E (Nippon Shokubai), 30 parts by weight of the melamine resin Cymel 328 (Mitsui-Cytec), both as hardeners, 2 parts by weight of ammonium monohydrogen phosphate as an acid catalyst, 15 parts by weight on the solid content basis, of Adelite AT20N (Asahi Denka Kogyo) as colloidal silica, and 5 parts by weight of Chemipearl W700 (Mitsui Petrochemical) as a wax, to give a water-based lubricating and rust inhibiting coating composition.

Examples 2-2 and 2-3

Water-based lubricating and rust inhibiting coating compositions were obtained in the same manner as in Example 2-1 except that the proportions shown in Table 6 were used.

Example 2-4

A water-based lubricating and rust inhibiting coating composition was obtained in the same manner as in Example 2-1 except that 20 parts by weight on the solid content basis, of the polycarbonate urethane resin emulsion Superflex F8124D (Daiichi Kogyo Seiyaku) was used in lieu of 10 parts by weight on the solid content basis, of Hydran HW960 (Dainippon Ink and Chemicals) and that the proportions shown in Table 6 were used.

Comparative Example 2-1

A water-based lubricating and rust inhibiting coating composition was obtained in the same manner as in Example 2-1 except that the polyurethane resin emulsion was omitted and that the proportions shown in Table 6 were used.

[Methods of evaluation]

The water-based lubricating and rust inhibiting coating compositions of Examples 2-1 to 2-4 and Comparative Example 2-1 as obtained in the above manner were respectively diluted with water to a non-volatile content of 20%, then applied to steel plates using a bar coater to give a dry film thickness of 2 μm, and dried by baking at an attained plate temperature of 150° C. for 8 seconds. The steel plates used were 0.5 mm electrogalvanized steel plates chromated with NRC300 (Nippon Paint). The weight of Cr fixed was 50 mg/m².

1. Solvent resistance

The test was performed in the same manner as in Example 1-15. The following evaluation criteria were used.

⊚: No abnormality.

o: Slight signs.

Δ: Exposure of ½ of the steel plate in area.

x : Dissolution of the coating and exposure of the steel plate.

2. Alkali resistance

The test was performed in the same manner as in Example 1-5. The following evaluation criteria were used.

⊚: No abnormality.

o: Only partial whitening.

Δ: Whitening in 50% of coated area.

x : Dissolution and whitening all over the surface.

3. Processability: cylindrical drawing test

The processing was performed with the resin-coated surface on the die side. The powder, adhering to the die, of the coating film peeled off was collected using a cellophane tape and evaluated for the extent of peeling. For powdering evaluation, the drawn portion was subjected to peeling with an adhesive tape and the extent of the powder resulting from peeling was examined.

The results are shown in Table 6.

The pressing conditions were as follows:

Wrinkling suppressing pressure: 3 tons

Punch diameter: 50 mm φ

Blank diameter: 95 mm φ

Drawing ratio: 1.92

Drawing rate: 300 mm/sec

The appearance was observed and evaluated according to the following criteria:

⊚: No adhesion to the die.

o: Slight adhesion to the die.

Δ: Adhesion to the die to an extent between o and x.

x: Large amount adding to the die.

The powdering was evaluated according to the following criteria:

⊚: No powder resulting from peeling.

o: Slight amount of powder resulting from peeling.

Δ: Between o and x.

x: Large amount of powder resulting from peeling.

4. Corrosion resistance

The test was performed in the same manner as in Example 1-15. The following evaluation criteria were used.

⊚: No abnormality.

o: Slight amount of white rust.

Δ: White rust over ½ of the coated surface area.

x: White rust all over the surface.

5. Overcoatability

The coated steel plates were baked at an attained plate temperature of 180° C.×20 seconds and then spray-coated with Orgaselect 120 White (Nippon Paint), followed by baking at 130° C. for 15 minutes. One day after painting, the coating films were cut crosswise (100 squares with a 2-mm distance between grooves) and the 3-mm coated plates were pressed out from the back side thereof in an Erichsen tester, followed by an attempt to peel off squares using a commercial adhesive tape. The adhesion was expressed in terms of [the number of squares peeled off with the tape]/100. The dry top coat film thickness was 30±3 μm.

6. Quick curing property

The test was performed in the same manner as in Example 1-15. The results of these tests are shown in Table 6.

TABLE 6

| Components:Parts by weight | Examples | | | | Comparative Example |
|---|---|---|---|---|---|
| (solid content basis) | 2-1 | 2-2 | 2-3 | 2-4 | 2-1 |
| Water-soluble alkyd resin vanish | 90 | 40 | 80 | 80 | 100 |
| Hydran HW960 | 20 | 60 | 20 | — | — |
| Superflex F8124D | — | — | — | 20 | — |
| Epocross K1050E | 20 | 20 | — | 20 | 20 |
| Cymel 328 | 30 | 30 | 30 | 30 | 30 |
| Acid catalyst | 2 | 2 | 2 | 2 | 2 |
| Colloidal silica | 15 | 15 | 15 | 15 | 15 |
| Wax | 5 | 5 | 5 | 5 | 5 |
| Film properties | | | | | |
| Solvent resistance | ⊚ | ⊚ | ⊚ | ⊚ | ⊚ |
| Alkali resistance | ⊚ | ⊚ | ⊚ | ⊚ | ⊚ |
| Cylindrical drawing tests | | | | | |
| Appearance | ⊚ | o | ⊚ | ⊚ | ⊚ |
| Powdering | ⊚ | ⊚ | ⊚ | ⊚ | o |
| Corrosion resistance | ⊚ | ⊚ | ⊚ | ⊚ | ⊚ |
| Overcoatability | 100/100 | 100/100 | 100/100 | 100/100 | 50/100 |
| Quick curing property (at 150° C.) (seconds) | 8 | 8 | 8 | 8 | 8 |

Resin Production Example 3-1

Phenol (94 parts), 37% formalin (405 parts) and aqueous sodium hydroxide (211 parts) were mixed and the reaction was carried out at 50° C. for 2 hours. After neutralization with hydrochloric acid, the reaction mixture was extracted with a mixed solvent composed of ethyl acetate and n-butanol (1:1) to give a resol type phenol resin solution with a solid content of 80%.

Examples 3-1 to 3-4 and Comparative Examples 3-1 to 3-3

Water-based coating compositions were prepared by blending the components shown in Table 7 in the proportions shown in the same table. In Table 7, Hydran HW935 is Dainippon Ink and Chemicals' polycarbonate-based polyurethane resin emulsion, the alkyd resin is the product obtained in Resin Production Example 2-1, XU-8096.07 is Dow Chemical Japan's phosphoric acid-modified, bisphenol A-derived epoxy resin [acid value=10, weight average molecular weight=about 10,000,100% neutralized with dimethylethanolamine (DEMA)], Shonol N-2 is Showa Highpolymer's aqueous resol type phenol resin (molecular weight 180 to 200), Cymel 328 is Mitsui-Cytec's imino type melamine resin (hardening initiation temperature 108° C.) and Catalyst 4050 is Mitsui-Cytec's sulfonic acid salt type acidic catalyst.

The water-based coating compositions of Examples 3-1 to 3-4 and Comparative Examples 3-1 to 3-3 as obtained in the above manner were diluted with water to a non-volatile content of 20% and applied, using a bar coater, to electrogalvanized steel plates to a dry film thickness of 2 to 3 μm after coat-type chromating, except for corrosion resistance testing. Drying or baking was carried out under the conditions specified in Table 7 to give test specimens. In Table 7, L in the column "drying or baking conditions" stands for 80° C.×10 seconds, M for 130° C.×15 seconds, and H for 150° C.×8 seconds.

[Methods of evaluation]

1. Solvent resistance

The coating surface of each test specimen was rubbed with gauze impregnated with MEK as pressed against said surface under a load of 300 g and the number of rubbings until destruction of the film was determined. The following evaluation criteria were used. The results are shown in Table 7.

⊚: Not less than 20 repetitions of rubbing.

o: 10 to 19 repetitions.

Δ: 5 to 9 repetitions.

Δx: 3 or 4 repetitions.

x: 1 or 2 repetitions.

2. Coin scratch test

The above test specimens were evaluated for scratch resistance by forcefully scratching them with a 10-yen coin under loading (5kg). The following evaluation criteria were used. The results are shown in Table 7.

⊚: No scratch.

o: Slight scratch.

Δ: Between o and x.

x: Complete peeling of the film.

3. Corrosion resistance

Figure 2:
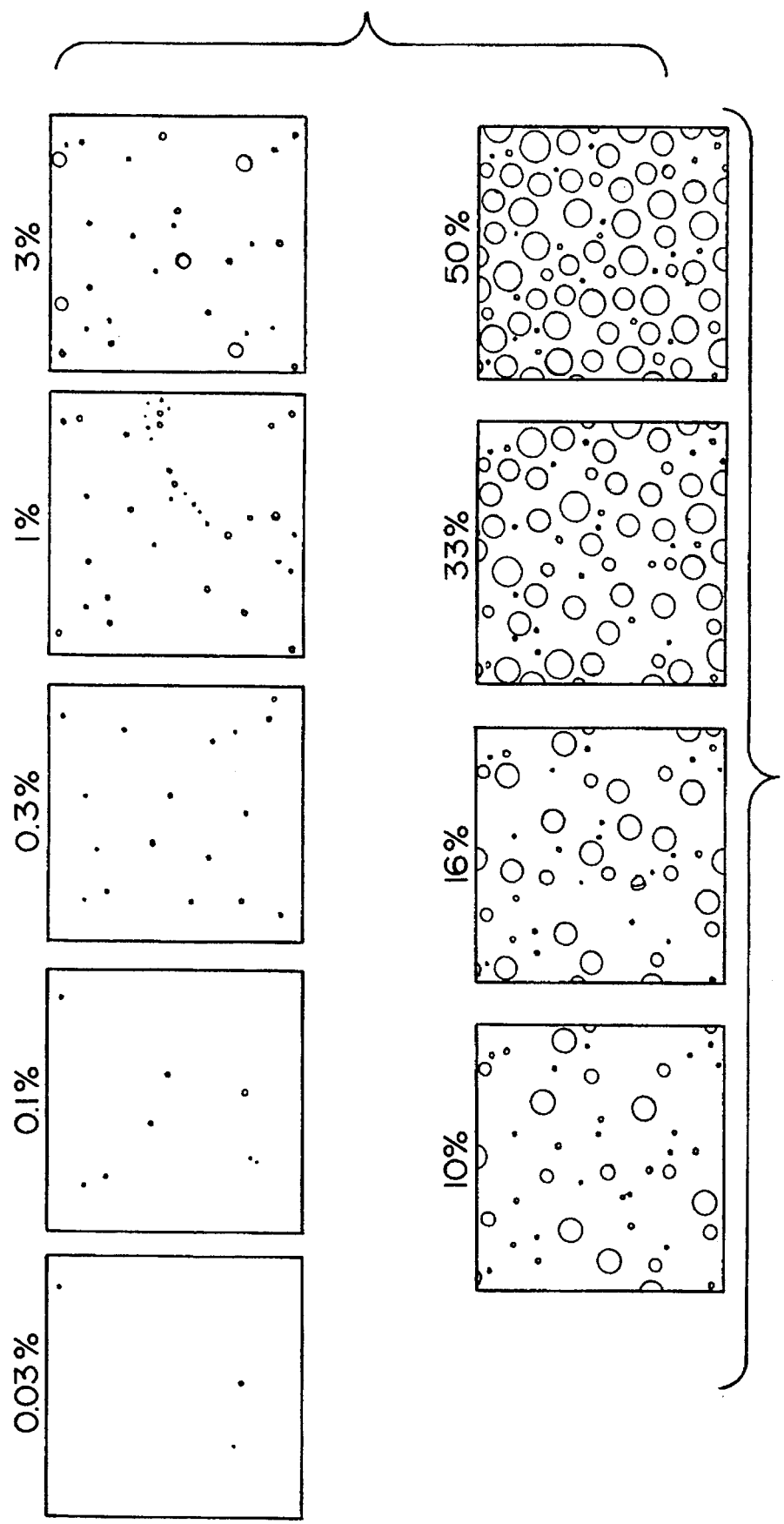
FIG. 2 illustrates reference standards for evaluating surface rusting according to ASTM D 610–68.

The aqueous dilutions (non-volatile content 20%) obtained as mentioned above were applied, using a bar coater, to solvent-degreased steel plates (JIS G 3141 SPCC-SD) to a dry film thickness of 2 to 3 μm and baked at an attained plate temperature of 150° C. for 15 seconds to give test specimens. The test specimens were subjected to salt spray test and, for each specimen, the time required to reach a degree of rusting of 0.3% as judged in accordance with FIG. 2 given in ASTM D610-68 (reference standards for evaluating area of rusting) was determined. The results are shown in Table 7.

Examples 3-5 to 3-8 and Comparative Examples 3-4 and 3-5

Formulations for application as rust inhibiting coating compositions for surface preparation for coating Water-based rust inhibiting coating compositions for surface preparation for coating were prepared by blending the components shown in Table 8 in the proportions shown in the same table, followed by dilution to a solid content of 20% and adjustment to pH 7. The above compositions were applied to hot dip galvanized steel plates (skin pass rolled and nonspangled; unchromated) to a dry film thickness of 2 to 3 μm for surface preparation, followed by application of Superlac DIF-P01 (Nippon Paint) as a primer and application of Nippe Supercoat 300HQ (Nippon Paint) as a top coat, to give coated galvanized steel plates (Examples 3-7 and 3-8 and Comparative Example 3-5). Further, the above compositions were applied, for surface preparation for coating, to SD dull steel plates, followed by application of the Superlac DIF-P01 primer and of Nippe Supercoat 300HQ as a top coat, to give coated steel plates (Examples 3-5 and 3-6 and Comparative Example 3-4).

In Table 8, L stands for drying/baking conditions of 80° C.×10 seconds, M for 130° C.×15 seconds, and H for 150° C.×8 seconds. In Table 8, Neothane UE1135 refers to Toa Gosei Chemical Industry's polycarbonate-based polyurethane resin emulsion, alkyd resin to the product of Resin Production Example 2-1, phenol resin to the resol type product obtained in Resin Production Example 3-1, Cymel 327 to Mitsui-Cytec's imino type melamine resin (hardening initiation temperature 108° C.), Adelite AT20N to Asahi Denka Kogyo's colloidal silica, LF Bosei M-PSN to Kikuchi Color and Chemicals' molybdic acid-based rust preventive pigment, and Irgacore 252 to Ciba-Geigy's rust preventive agent.

[Methods of evaluation]
1. Top coat water resistance

The coated steel plates obtained in the above manner were immersed in tap water at 40° C. for 240 hours and then examined for coating film blistering as shown in FIG. 3. In FIG. 3, Nos. 2, 4, 6 and 8 indicate the sizes of blisters and F, M, MD and D indicate the steps in frequency or density at each step in size. The following evaluation criteria were used. The results are shown in Table 8.

o: No blistering.

Δ: Few blisters (F) (ASTM reference standard)

x : Medium blistering (M) (ASTM reference standard)

x x : Medium dense (MD) or dense (D) blistering (ASTM reference standards)

2. Corrosion resistance

The coated steel plates of Examples 3-5 and 3-6 and Comparative Example 3-4 were subjected to the salt spray test prescribed in JIS Z 2371 for 480 hours and those of Examples 3-7 and 3-8 and Comparative Example 3-5 to the same test for 1,000 hours, and the coated surfaces were examined for rusting.

The galvanized steel plates (Examples 3-7 and 3-8 and Comparative Example 3-5) were tested for flat portion corrosion resistance. The evaluation criteria used were the same as those in Example 2-1.

As regards the steel plates of Examples 3-5 and 3-6 and Comparative Example 3-4, the above test specimens were degreased and given, on the diagonal, a damage extending to the steel plate surface using a sharp-edged knife (cutter knife) and subjected to salt spray test for 100 hours. The surface moisture was wiped off, the test specimens were dried, and an adhesive tape was applied under pressure to the surface along the cut and then peeled off quickly. The width (mm) of the coating film peeled off was measured. The following evaluation criteria were used. The results are shown in Table 8.

o: Less than 2 mm in peeling width.

Δ: 2 to 5 mm in peeling width.

x : Over 5 mm in peeling width.

Examples 3-9 to 3-18 and Comparative Examples 3-6 to 3-10

Formulations for application as water-based lubricating and rust inhibiting coating compositions Water-based lubricating and rust inhibiting coating compositions were prepared by blending the components shown in Tables 9, 10 and 11 in the proportions shown in the same tables, diluting the mixtures to a solid content of 20% and adjusting the pH to 8.

The above compositions were applied to electrogalvanized steel plates (subjected to coat type chromating) to a dry film thickness of 1 to 2 μm, followed by further application of Orgaselect 100 White (water-based melamine alkyd paint; Nippon Paint) to a dry film thickness of 25 to 30 μm, to give coated steel plates. In Table 9, 10 and Table 11, Hydran HW950 refers to Dainippon Ink and Chemicals' polyether type polyurethane resin emulsion, Superflex F8123D to Diichi Kogyo Seiyaku's polyester type polyurethane resin emulsion, Hydran HW960 to Dainippon Ink and Chemicals' polyester type polyurethane resin emulsion, Superflex F8124D to Daiichi Kogyo Seiyaku's polycarbonate type polyurethane resin emulsion, alkyd resin to the alkyd resin obtained in Resin Production Example 2-1 (acid value=39, hydroxyl value=140, SP value=10.4), phenol resin to the aqueous resol type phenol resin obtained in Resin Production Example 3-1, Adelite AT30A to Asahi Denka Kogyo's colloidal silica, Chemipearl WF640 to Mitsui Petrochemical's polyethylene wax, emulsified Primacor 598 to an emulsion of Dow Chemical's ethylene-acrylic resin, and EM1100 to Nippon Paint's polyacrylic emulsion.

The water-based lubricating and rust inhibiting coating compositions of Examples 3-9 to 3-18 and Comparative Examples 3-6 to 3-10 as obtained in the above manner were diluted with water to a non-volatile content of 20% and applied, using a bar coater, to steel plates to a dry film thickness of 2 μm and dried by baking under the conditions specified in Table 9, Table 10 and Table 11. In Table 9, Table 10 and Table 11, HH refers to baking conditions of 180° C.×15 seconds, H to 150° C.×8 seconds, M to 140° C.×10 seconds, and L to 80° C.×10 seconds. The steel plates used were 0.5 mm electrogalvanized steel plates chromated with NRC300 (Nippon Paint). The weight of Cr applied was 50 mg/m².

[Methods of evaluation]

The solvent resistance, powdering upon cylindrical drawing test and overcoatability were examined in the same manner as in Example 2-1. For corrosion resistance evaluation, the salt spray test according to JIS z 2371 was carried out for 1,000 hours and then the coated surface was examined for rusting. The evaluation criteria were the same as those in Example 2-1. The results are shown in Table 9, Table 10 and Table 11.

1. Tg of film

The film Tg was determined by the stepwise temperature lowering method using a constant microload thermal expansion measuring apparatus (Seiko Instruments model SSC5000 TMA) under conditions of maximum programmed temperature 80° C., full scale 200 μm and temperature lowering rate 5° C./13 minutes, followed by reading of the point of inflection on the displacement curve. The results are shown in Table 9, Table 10 and Table 11.

2. Coefficient of dynamic friction

The coefficient of dynamic friction was determined using a Baudenleben type dynamic friction coefficient measuring apparatus. The results are shown in Table 9, Table 10 and Table 11. It was revealed that when the film Tg is not lower than 40° C., the coefficient of dynamic friction is not more than 0.1.

3. Coin scratch test

The test specimens mentioned above were scratched with a 10-yen coin under loading (kg) and the load at which damaging began was determined. The evaluation criteria mentioned below were used. The results are shown in Table 9, Table 10 and Table 11. It was found that when the film Tg is not lower than 50° C., said load is not smaller than 5 kg, hence damaging hardly occurs and the lubricating ability in processing is good.

⊚: Damaging at a load of 6 to 7 kg.
o: Damaging at a load of 4 to 5 kg.
Δ: Damaging at a load of 2 to 3 kg.
x : Damaging at a load of 1 kg.

4. Film elongation percentage

Films with a thickness of 30 μm were produced by applying the compositions of Examples 3-11, 3-14 and 3-18 and Comparative Examples 3-6, 3-9 and 3-10 to polypropylene plates, followed by baking and, after standing at 20° C. and 70% relative humidity for 24 hours, subjected to film elongation percentage measurement in accordance with JIS K 7127 at a pulling rate of 50 mm/minute. The results are shown in Table 9, Table 10 and Table 11. It was revealed that when the film elongation percentage is not less than 3%, good results are obtained with respect to powdering.

Example 3-19

Formulation for application as a water-based lubricating and rust inhibiting coating composition for automobiles A water-based lubricating and rust inhibiting coating composition for automobiles was prepared by charging a Disper mill in sequence with 20 parts by weight (resin solid basis) of the phenol resin of Resin Production Example 3-1, 10 parts by weight (solid basis) of an imino-methylol type melamine (Cymel 328, Mitsui-Cytec), 2 parts by weight (solid basis) of ammonium dihydrogen phosphate, 100 parts by weight (solid basis) of Hydran HW935 (Dainippon Ink and Chemicals), 15 parts by weight (solid basis) of Aerosil MOX 170 (Nippon Aerosil Co.) made colloidal using boric acid, 5 parts by weight (solid basis) of Chemipearl WF640 (Mitsui Petrochemical) and 5 parts by weight (solid basis) of the melamine cyanurate MC-420 (Nissan Chemical Industries), followed by mixing uniformly, dilution to a solid content of 20% and adjustment to pH 6.5.

The above composition was applied to zinc-nickel electroplated steel plates (chromated) to give a dry film thickness of 1 to 2 μm. To the steel plates were further applied the cationic electrodeposition paint Powertop U2550 (Nippon Paint) to a dry film thickness of 20 to 25 μm to give coated steel plates.

[Methods of evaluation]

Evaluations for solvent resistance, powdering upon cylindrical drawing and overcoatability were performed in the same manner as in Example 2-1.

1. Top coat corrosion resistance

For flat portion corrosion resistance evaluation, the coated plates were subjected to salt spray test in accordance with JIS Z 2371 for the period shown in Table 11 and then examined for rusting of the coated surface. The evaluation criteria were the same as those used in Example 2-1.

The results are shown in Table 11.

This example showed that when the film Tg is not lower than 40° C., preferably not lower than 50° C., and the film elongation percentage is not smaller than 3%, the coefficient of dynamic friction is small and the lubricating ability in processing is high, with good results attainable with respect to scratching and powdering.

TABLE 7

| Components:Parts by weight (solid content basis) | Examples | | | | Comparative Examples | | |
|---|---|---|---|---|---|---|---|
| | 3-1 | 3-2 | 3-3 | 3-4 | 3-1 | 3-2 | 3-3 |
| Hydran HW935 | 100 | 100 | 100 | 100 | — | 50 | — |
| Alkyd resin vanish | — | — | — | — | 100 | 100 | — |
| XU-8096.07 | — | — | — | — | — | — | 100 |
| Shonol N-2 | 20 | 20 | 20 | 20 | — | — | 20 |
| Cymel 328 | 5 | 5 | — | — | 20 | 20 | 10 |
| Catalyst 4050 | 2.5 | — | 2.5 | — | 2.5 | 2.5 | 2.5 |
| Solvent resistance | | | | | | | |
| Drying or baking condtions | | | | | | | |
| L | O | ΔX | O | Δ | X | X | X |
| M | ⊚ | O | O | O | X | X | X |
| H | ⊚ | O | ⊚ | ⊚ | O | O | X |
| Coin scratch test | | | | | | | |
| Drying or baking condtions | | | | | | | |
| L | ⊚ | ⊚ | ⊚ | ⊚ | X | X | X |
| M | ⊚ | ⊚ | ⊚ | ⊚ | X | X | X |
| H | ⊚ | ⊚ | ⊚ | ⊚ | Δ | O | X |
| Corrosion resistance (hours) | 120 | 100 | 120 | 120 | 10 | 10 | 20 |

TABLE 8

| Components:Parts by weight (solid content basis) | Examples | | | | Comparative Examples | |
|---|---|---|---|---|---|---|
| | 3-5 | 3-6 | 3-7 | 3-8 | 3-4 | 3-5 |
| Neothane UE1135 | 100 | 100 | 100 | 100 | — | 30 |
| Alkyd resin vanish | 0.7 | 0.7 | 0.7 | 0.7 | 0.7 | 100 |
| XU-8096.07 | — | — | — | — | 100 | — |
| Phenol resin | 20 | 30 | 20 | 30 | 50 | — |
| Cymel 327 | 10 | — | 10 | — | — | 20 |
| Ammonium monohydrogen phosphate | 3 | — | 3 | — | — | 3 |
| Adelite AT20N | 10 | 10 | 10 | 10 | 10 | 10 |
| LF Bosei M-PSN | 2 | 2 | 2 | 2 | 2 | 2 |
| Irgacor 252 | 5 | 5 | 5 | 5 | 5 | 5 |
| Top coat water resistance | | | | | | |
| Drying or baking conditions | | | | | | |
| L | O | Δ | — | — | X | — |
| M | O | O | — | — | X | — |
| H | O | O | — | — | Δ | O |

TABLE 8-continued

| Components:Parts by weight (solid content basis) | Examples | | | | Comparative Examples | |
|---|---|---|---|---|---|---|
| | 3-5 | 3-6 | 3-7 | 3-8 | 3-4 | 3-5 |
| Corrosion resistance | | | | | | |
| Drying or baking condtions | | | | | | |
| L | ○ | Δ | ○ | Δ | X | X |
| M | ○ | ○ | ⊚ | ⊚ | X | X |
| H | ○ | ○ | ⊚ | ⊚ | X | Δ |

TABLE 9

| Components:Parts by weight (solid content basis) | Examples | | | | | |
|---|---|---|---|---|---|---|
| | 3-9 | 3-10 | 3-11 | 3-12 | 3-13 | 3-14 |
| Hydran HW950 | 100 | — | — | — | — | — |
| Superflex F8123D | — | 100 | — | — | — | — |
| Hydran HW960 | — | — | 100 | — | — | — |
| Superflex F8124D | — | — | — | 100 | — | — |
| Hydran HW935 | — | — | — | — | 100 | — |
| Neothane UE1135 | — | — | — | — | — | 100 |
| Phenol resin | 5 | 15 | — | — | — | — |
| Shonol N-2 | — | — | 20 | 25 | 25 | 30 |
| Cymel 327 | 20 | 10 | — | — | — | — |
| Catalyst 4050 | 3 | — | — | — | 3 | 3 |
| Ammonium monohydrogen phosphate | — | 3 | 3 | — | — | — |
| Adelite AT30A | 15 | 15 | 15 | 15 | 15 | 15 |
| Chemipearl WF640 | 5 | 5 | 5 | 5 | 5 | 5 |
| Solvent resistance | | | | | | |
| Drying or baking condtion | H | M | H | H | M | L |
| Results | ⊚ | ⊚ | ⊚ | ⊚ | ⊚ | ⊚ |
| Film Tg (°C.) | 44 | 46 | 47 | 57 | 59 | 51 |
| Coefficient of dynamic friction | 0.06 | 0.08 | 0.07 | 0.07 | 0.06 | 0.07 |
| Coin scratch test | ○ | ○ | ○ | ⊚ | ⊚ | ⊚ |
| Film elongation percentage (%) | — | — | 4.7 | — | — | 5 |
| Powdering | ○ | ⊚ | ⊚ | ⊚ | ⊚ | ⊚ |
| Flat portion corrosion resistance | ⊚ | ⊚ | ⊚ | ⊚ | ⊚ | ⊚ |
| Overcoatability | 100 | 100 | 100 | 100 | 100 | 100 |

TABLE 10

| Components:Parts by weight (solid content basis) | Examples | | | |
|---|---|---|---|---|
| | 3-15 | 3-16 | 3-17 | 3-18 |
| Superflex F8124D | — | — | 100 | 100 |
| Hydran HW935 | — | 100 | — | — |
| Neothane UE1135 | 100 | — | — | — |
| Shonol N-2 | 25 | 25 | 50 | 100 |
| Catalyst 4050 | — | — | — | 3 |
| Adelite AT30A | 15 | 15 | 15 | 15 |
| Chemipearl WF640 | 5 | 7 | 7 | 7 |
| Solvent resistance | | | | |
| Drying or baking condtion | L | HH | H | H |
| Results | ⊚ | ○ | ⊚ | ⊚ |
| Film Tg (°C.) | 57 | 59 | 61 | 62 |
| Coefficient of dynamic friction | 0.07 | 0.06 | 0.06 | 0.06 |
| Coin scratch test | ⊚ | ⊚ | ⊚ | ○ |
| Film elongation percentage (%) | — | — | — | 3 |
| Powdering | ⊚ | ⊚ | ⊚ | ○ |
| Flat portion corrosion resistance | ⊚ | ⊚ | ⊚ | ○ |
| Overcoatability | 100 | 100 | 100 | 100 |

TABLE 11

| Components:Parts by weight (solid content basis) | Comparative Examples | | | | |
|---|---|---|---|---|---|
| | 3-6 | 3-7 | 3-8 | 3-9 | 3-10 |
| Hydran HW935 | 30 | 30 | — | — | — |
| Alkyd resin | 100 | 100 | 100 | — | — |
| Emulsified Primacor 598 | — | — | — | 100 | — |
| EM1100 | — | — | — | — | 100 |
| Shonol N-2 | — | — | — | 20 | 20 |
| Cymel 327 | 20 | 20 | 30 | — | — |
| Catalyst 4050 | — | — | — | 3 | 3 |
| Ammonium monohydrogen phosphate | 3 | 3 | 3 | — | — |
| Adelite AT30A | 15 | 15 | 15 | 15 | 15 |
| Chemipearl WF640 | 5 | 5 | 5 | 5 | 5 |
| Solvent resistance | | | | | |
| Drying or baking condtion | H | L | H | M | L |

TABLE 11-continued

| Components:Parts by weight (solid content basis) | Comparative Examples | | | | |
|---|---|---|---|---|---|
| | 3-6 | 3-7 | 3-8 | 3-9 | 3-10 |
| Results | O | X | O | O | X |
| Film Tg (°C.) | 49 | 35 | 37 | 36 | 35 |
| Coefficient of dynamic friction | 0.07 | 0.1 | 0.09 | 0.15 | 0.17 |
| Coin scratch test | O | Δ | Δ | Δ | X |
| Film elongation percentage (%) | 2 | — | — | 10 | 1* |
| Powdering | O | X | Δ | X | X |
| Flat portion corrosion resistance | O | Δ | Δ | X | X |
| Overcoatability | 100 | 90 | 100 | 50 | 10 |

*not more than 1

TABLE 12

| Components:Parts by weight (solid content basis) | Example 3-19 |
|---|---|
| Hydran HW935 | 100 |
| Phenol resin | 20 |
| Cymel 328 | 10 |
| Ammonium dihydrogen phosphate | 2 |
| Aerosil MOX 170 | 15 |
| Chemipearl WF640 | 5 |
| Melamine cyanurate MC-420 | 5 |
| Solvent resistance | |
| MEK rubbing test | ⊙ |
| Powdering | ⊙ |
| overcoatability | 100 |
| Top coat corrosion resistance (houres) | O 1500 |

We claim:

1. A water-based coating composition which comprises 100 parts by weight, on the solid content basis, of a self-emulsifying polycarbonate-based polyurethane resin emulsion and 5 to 100 parts by weight, on the solid content basis, of an aqueous resol phenol resin and the water-based coating composition has a pH of 7.0 to 10, and further comprising at least one member selected from the group consisting of oxazoline compounds having a glass transition temperature of not lower than 40° C. and containing a styrenic polymer or a styrene-acrylic copolymer, and melamine resins having a curing initiation temperature of not higher than 140° C., the total amount, on the solid content basis, of said member and the aqueous phenol resin being 10 to 200 parts by weight.

2. A water-based coating composition as claimed in claim 1, wherein the melamine resins are the imino and/or methylol melamine resins.

3. A water-based rust inhibiting coating composition which comprises 100 parts by weight, on the solid content basis, of the water-based coating composition of claim 1 and 1 to 40 parts by weight of at least one member selected from the group consisting of rust preventive pigments having an electric conductivity of not higher than 600 μS/cm and finely divided silica, an aqueous dispersion of which has a pH of 6 to 9, as added to said composition.

4. A water-based lubricating and rust inhibiting composition which comprises 100 parts by weight, on the solid content basis, of the water-based rust inhibiting coating composition of claim 3 and, further, 3 to 15 parts by weight, on the solid content basis, of a wax.

5. A water-based lubricating and rust inhibiting composition for automobiles which comprises 100 parts by weight, on the solid content basis, of the water-based lubricating and rust inhibiting coating composition of claim 4 and, further, 0.05 to 25 parts by weight, on the solid content basis, of a melamine cyanurate compound.

6. A water based coating which comprises 100 parts by weight, on the solid content basis, of the water-based coating composition of claim 4 and, further, 0.5 to 5 parts by weight, on the solid content basis, of at least one acidic catalyst selected from the group consisting of dodecylbenzensulfonic acid, amine salts and ammonium salts thereof, dinonylnaphthalensulfonic acid, amine salts and ammonium salts thereof, acidic amine salts and ammonium salts of phosphoric acid, aminotri(methylenephosphonic acid), 1-hydroxyethylidene-1,1-diphosphonic acid, ethylenediaminetetra (methylenephosphonic acid), and amine salts and ammonium salts thereof.

* * * * *